United States Patent
Bantz et al.

(10) Patent No.: US 8,856,023 B2
(45) Date of Patent: *Oct. 7, 2014

(54) METHODS AND APPARATUS FOR INTERACTIVE SPECIFICATION OF CONTEXT-SENSITIVE SERVICE LEVEL AGREEMENTS; FOR PROVISIONING OF RESOURCES REQUIRED DURING SERVICE DELIVERY EVENTS REGULATED BY SERVICE LEVEL AGREEMENTS; AND FOR MONITORING COMPLIANCE WITH SERVICE LEVEL AGREEMENTS DURING SERVICE DELIVERY EVENTS

(75) Inventors: David F. Bantz, Portland, ME (US); Thomas E. Chefalas, Somers, NY (US); Peter W. Gayek, Chapel Hill, NC (US); Walter C. Huber, Baden (AT); Srikant Jalan, Cortlandt Manor, NY (US); Patrik Lehrner, Neufeld an der Leitha (AT); Steven J. Mastrianni, Unionville, CT (US); Marco Porak, Vienna (AT)

(73) Assignee: International Business Machines Corporation, Armonk, NY (US)

( * ) Notice: Subject to any disclaimer, the term of this patent is extended or adjusted under 35 U.S.C. 154(b) by 164 days.

This patent is subject to a terminal disclaimer.

(21) Appl. No.: 12/583,120

(22) Filed: Aug. 13, 2009

(65) Prior Publication Data

US 2009/0307041 A1   Dec. 10, 2009

Related U.S. Application Data

(60) Division of application No. 12/062,697, filed on Apr. 4, 2008, which is a continuation of application No. 11/346,751, filed on Feb. 2, 2006, now abandoned.

(51) Int. Cl.
*G06Q 10/00* (2012.01)
*G06F 17/30* (2006.01)

(52) U.S. Cl.
USPC ..... 705/7.38; 705/7.41; 705/14.51; 705/26.1; 709/219; 709/223; 709/226

(58) Field of Classification Search
USPC .......................................................... 707/3
See application file for complete search history.

(56) References Cited

U.S. PATENT DOCUMENTS 6,917,979 B1   7/2005   Dutra et al.
6,925,493 B1   8/2005   Barkan et al.
(Continued)

FOREIGN PATENT DOCUMENTS

JP   2002409401 A   4/2002
JP   2003150723 A   5/2003
(Continued)

OTHER PUBLICATIONS

"Analysis on Service Level Agreement of Web Services"—HP Corporation, Jun. 2002 http://www.csd.uoc.gr/~hy565/newpage/docs/pdfs/papers/HPL-2002-180.pdf.*
(Continued)

*Primary Examiner* — Randy Scott
(74) *Attorney, Agent, or Firm* — Harrington & Smith; Preston J. Young

(57) ABSTRACT

In a first aspect of the present invention, methods and apparatus implement graphical user interfaces for interactively specifying service level agreements used to regulate delivery of services to, for example, computer systems. An interactive graphical user interface allows a user to see the effects of varying values of service delivery variables on the level of service achievable in a particular service delivery context. In a second aspect, methods and apparatus of the present invention provision resources required for service delivery. In the second aspect, the methods and apparatus of the present invention select a service delivery model dependent on context. The selected service delivery model is used to provision resources that will be required during service delivery. In a third aspect, methods and apparatus of the present invention monitor compliance with a service level agreement during a service delivery event. In instances where a given service delivery does not comply with service level attributes specified in a controlling service level agreement, the methods and apparatus of the present invention take corrective action.

18 Claims, 20 Drawing Sheets

(56) References Cited

U.S. PATENT DOCUMENTS

| | | | |
|---|---|---|---|
| 6,959,335 B1 | 10/2005 | Hayball et al. | 709/227 |
| 7,606,895 B1* | 10/2009 | Dini et al. | 709/224 |
| 7,610,219 B2* | 10/2009 | Sayed | 705/26 |
| 7,870,012 B2* | 1/2011 | Katz et al. | 705/7.26 |
| 2002/0039352 A1 | 4/2002 | El-Fekih et al. | 370/252 |
| 2002/0042756 A1 | 4/2002 | Kumar et al. | 705/26 |
| 2002/0049608 A1 | 4/2002 | Hartsell et al. | |
| 2002/0065907 A1 | 5/2002 | Cloonan et al. | 709/223 |
| 2002/0099669 A1 | 7/2002 | Lauer | 705/80 |
| 2002/0131374 A1* | 9/2002 | Lee | 370/254 |
| 2002/0181685 A1 | 12/2002 | Doherty et al. | |
| 2003/0009580 A1 | 1/2003 | Chen et al. | 709/231 |
| 2003/0123446 A1 | 7/2003 | Muirhead et al. | 370/392 |
| 2003/0191826 A1* | 10/2003 | Bellinger et al. | 709/220 |
| 2004/0073436 A1* | 4/2004 | Vaishnavi | 705/1 |
| 2004/0177138 A1 | 9/2004 | Salle et al. | 709/223 |
| 2004/0186905 A1* | 9/2004 | Young et al. | 709/225 |
| 2004/0236846 A1* | 11/2004 | Alvarez et al. | 709/223 |
| 2005/0010456 A1 | 1/2005 | Chang et al. | 705/7 |
| 2005/0043979 A1* | 2/2005 | Soares et al. | 705/7 |
| 2005/0044099 A1 | 2/2005 | Soares et al. | 707/102 |
| 2005/0071453 A1 | 3/2005 | Ellis et al. | |
| 2005/0071458 A1 | 3/2005 | Fisher et al. | 709/224 |
| 2005/0172027 A1 | 8/2005 | Castellanos et al. | 709/229 |
| 2005/0177545 A1 | 8/2005 | Buco et al. | 707/1 |
| 2005/0256946 A1 | 11/2005 | Childress et al. | 709/223 |
| 2005/0283376 A1 | 12/2005 | Miyoshi et al. | 705/1 |
| 2007/0143775 A1* | 6/2007 | Savoor et al. | 725/1 |
| 2009/0077210 A1* | 3/2009 | Musman et al. | 709/223 |

FOREIGN PATENT DOCUMENTS

| | | | |
|---|---|---|---|
| JP | 2004185442 A | 7/2004 | |
| JP | 2005108220 | 4/2005 | |
| JP | 2005301845 A | 10/2005 | |
| JP | 2006-004207 | 1/2006 | |
| TW | 405091 B | 9/2000 | |

OTHER PUBLICATIONS

"SLAs a Key Commercial Tool"—Cite Seer X, May 2004 http://citeseerx.ist.psu.edu/viewdoc/download?doi=10.1.1.107.9295&rep=rep1&type=pdf.* http://web.bsd.uchicago.edu/bsd_web_sla.pdf "Service Level Agreement"—UIC Aug. 2007.* http://repository.cmu.edu/cgi/viewcontent.cgi?article=1293&context=sei "Service Level Agreements in Service-Oriented Architecture Environments" Software Engineering Institute Sep. 1, 2008.* http://dspace.mit.edu/handle/1721.1/6312 "Constraints: A Language for Expressing Almost-Hierarchical Descriptions" Sussman, Gerald Jay; Steel, Guy Lewis, Jr. Aug. 1, 1981.*

IBM, "Tivoli Service Level Advisor-Software", http://www-01.ibm.com/software/tivoli/products/service-level-advisor/.

IBM, "Tivoli Service Level Advisor-Software", Printed Feb. 11, 2010, pp. 1-3.

"Business Process Execution Language for Web Services 1.1", May 5, 2003, Internet at ftp://www6.software.ibm.com/software/developer/library/ws-bpel.pdf, pp. 1-136.

Ludwig, H. et al., "Web Service Level Agreement (WSLA) Language Specification", Version 1.0, Internet at www.research.ibm.com/wsla/WSLASpec_V1-20030128.pdf, pp. 1-110.

Dan, A. et al., "Web Services on Demand: WSLA-Driven Automated Management", IBM Systems Journal vol. 43, No. 1, 2004.

"Web Hosting Service Level Agreement"; Aug. 2007; whole document (9 pages); University of Chicago, Biological Sciences Division Information Services; http://web.bsd.uchicago.edu/bsd_web_sla/pdf.

Bianco, P., et al.; "Service Level Agreements in Service-Oriented Architecture Environments"; Sep. 2008; whole document (50 pages); Software Engineering Institute; http://www.sei.cmu.edu/reports/08tn021.pdf.

Grosof, B.; "Courteous Logic Programs: Prioritized Conflict Handling for Rules"; Dec. 30, 1997 (revised from May 8, 1997); IBM Research Report RC 20836; whole document (57 pages); [extended version of "Prioritized Conflict Handling for Logic Programs" Proceedings of the International Symposium on Logic Programming, ILPS-1997; pp. 197-211; MIT PRESS].

Steele, G.L. et al.; "Constraints—A Language for Expressing Almost-Hierarchical Descriptions"; Artificial Intelligence, vol. 14; 1980; pp. 1-39; North-Holland Publishing Company.

* cited by examiner

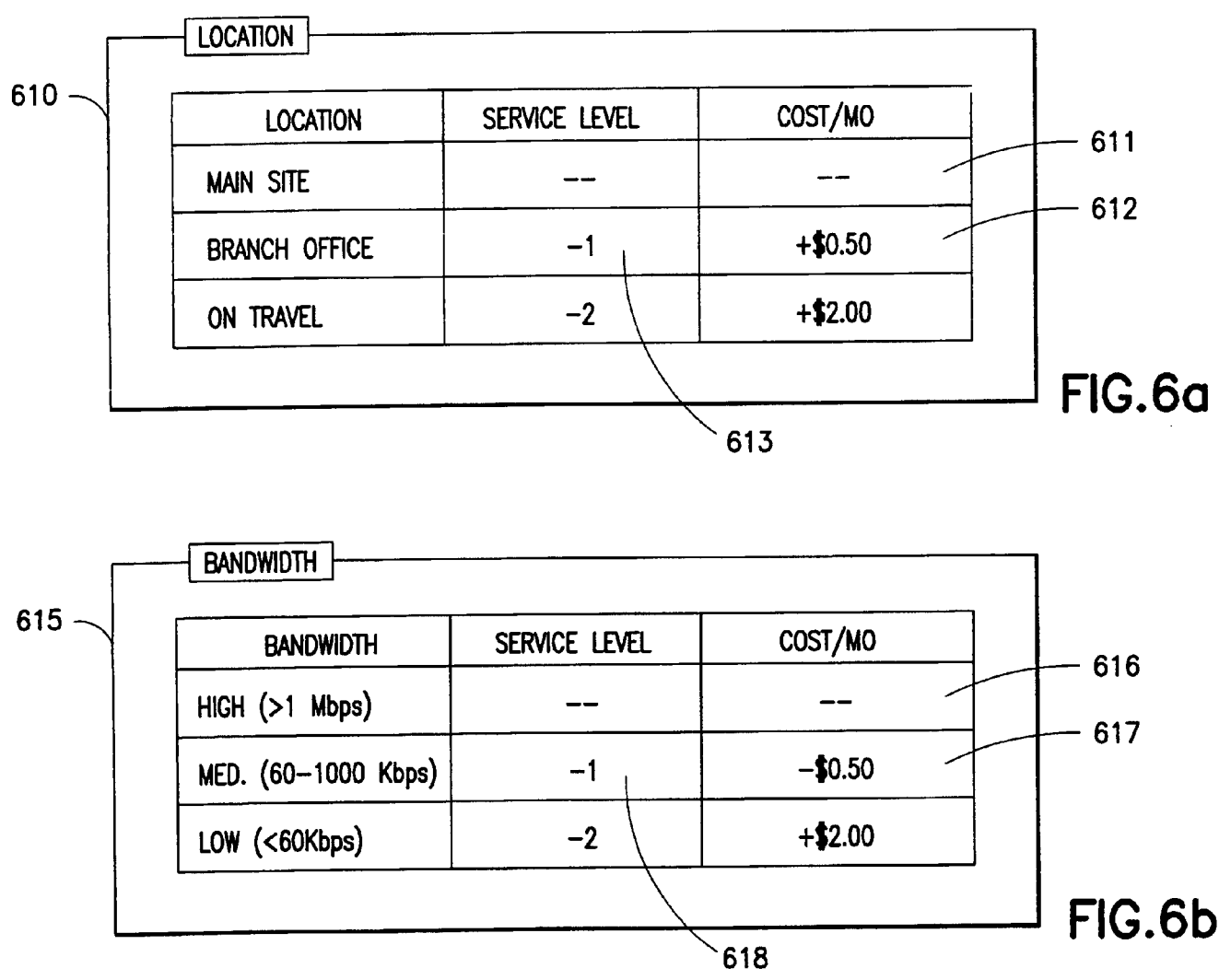

| LOCATION | | |
|---|---|---|
| LOCATION | SERVICE LEVEL | COST/MO |
| MAIN SITE | -- | -- |
| BRANCH OFFICE | -1 | +$0.50 |
| ON TRAVEL | -2 | +$2.00 |

FIG.6a

| BANDWIDTH | | |
|---|---|---|
| BANDWIDTH | SERVICE LEVEL | COST/MO |
| HIGH (>1 Mbps) | -- | -- |
| MED. (60–1000 Kbps) | -1 | -$0.50 |
| LOW (<60Kbps) | -2 | +$2.00 |

FIG.6b

METHODS AND APPARATUS FOR INTERACTIVE SPECIFICATION OF CONTEXT-SENSITIVE SERVICE LEVEL AGREEMENTS; FOR PROVISIONING OF RESOURCES REQUIRED DURING SERVICE DELIVERY EVENTS REGULATED BY SERVICE LEVEL AGREEMENTS; AND FOR MONITORING COMPLIANCE WITH SERVICE LEVEL AGREEMENTS DURING SERVICE DELIVERY EVENTS

CROSS REFERENCE TO RELATED APPLICATION

This application is a divisional of copending U.S. patent application Ser. No. 12/062,697 filed Apr. 4, 2008 which is a continuation of U.S. patent application Ser. No. 11/346,751 filed Feb. 2, 2006, now abandoned.

TECHNICAL FIELD

The present invention generally concerns service level agreements for use in managing service delivery to, for example, computer systems, and more particularly concerns specification of service level agreements; provisioning of resources required during service delivery events, wherein the service delivery events are subject to one or more service level agreements; and monitoring compliance with service level agreements during service delivery events.

BACKGROUND

Computers require service, as do most complex systems. It is common in the information technology industry for various services (ordering, upgrading, maintenance, replacement) to be provided on an outsourced basis by a service provider. Service providers often provide services at higher quality and at lower cost than the staff of a company that owns the computers. This is due to economies of scale; creation, sustenance and refinement of specialized skills on the staff of the service provider; and specialized infrastructure created by and for the service provider.

Service providers commonly contract with a customer to provide a specific set of services. These services are provided at a certain service level, and the clauses of a contract concerning service levels are commonly referred to as Service Level Agreements, or SLAs. A service level of a service specifies, among other things, how quickly the service is to be initiated when a request is made by customers. A service level may also specify the duration of the service and other quantities descriptive of service delivery. In current practice, SLAs are written for static service levels. For example, a typical SLA specifies a four-hour response to a maintenance request to fix an inoperable computer.

In today's fast-paced, dynamic business environment, both the circumstances of need and the context of service delivery may vary. By "context" is meant the circumstances under which a service is delivered. For example, it may be necessary that a business's computers be highly available at a certain time of the month, because that time reflects a time of high sales or externally-imposed deadlines. Similarly, the delivery of services to a mobile computer may be lengthier if that computer is located off the customer's premises and can communicate only over a telephone line. It is to the advantage of both the customer and the service provider to agree to SLAs that take account of the specific context of the delivery of a service.

When a customer of a service provider selects services, one consideration may be that different employees of that customer may have different needs for services, and needs for service levels for those services as a function of their position in the customer's organization or their functional responsibility. It is to be appreciated that in today's dynamic organizational context a given service consumer may have different functional responsibilities at different times. Thus it is advantageous for the organizational affiliation, functional responsibility and other such consumer attributes to be considered as part of the context in which the service is provided.

Similarly, when services are selected it may be advantageous to only offer services known to be of value to specific industries, or in specific countries. Although a regulatory environment for a given enterprise is often determined by the country in which it operates, a given enterprise may itself be subject to specific regulation; the regulatory environment may differ according to location or even according to a task to be performed. Thus it is advantageous for the industry type and regulatory environment, however it is determined, to be considered part of the context in which the service is provided. In addition to the aforementioned, there may be other considerations advantageously included in the context in which the service is provided.

In addition to these desired attributes of a new type of service level agreement, numerous problems in the field of service level agreements have been encountered. In particular, services are often provided in a dynamic environment, where several service delivery variables can significantly impact the timeliness and cost of a service. In such situations, relatively static service level agreements are of little use to the parties to a contemplated service delivery transaction in specifying realistic contract terms that cover a range of possible service delivery scenarios.

Service consumers may find that the service contracted for is too costly and that a less responsive service would have been satisfactory, or the exact opposite—that the service contracted for is not responsive enough and that the added cost of a more responsive service would have been justified. Service providers may find that an agreed-to service delivery may have been based on unrealistic and too-optimistic resource availability estimates. In such situations, the service provider will absorb the added cost associated with acquisition of the scarce resource, thereby lessening expected profits.

Other problems are encountered. Once a service level agreement has been agreed to, and a service delivery event has occurred, actions will need to be taken to actually deliver the service. In situations where relatively static service level agreements have been entered into, the service provider may have little idea about how best to deliver the service. A service provider may over-subscribe a costly resource to provide the service at an agreed-to level, in essence actually providing a higher-quality (and more expensive) service than is necessary.

Further problems have been encountered in the field of service level agreements. After a service delivery event has been identified and service delivery has commenced, the parties often have no way to measure whether the service is being provided at the desired service level during the period when the service is actually being delivered. The parties, in fact, may never know, because an after-the-fact analysis may not have access to facts surrounding the service delivery as it occurred due to the often fleeting nature of such information.

Accordingly, those skilled in the art seek methods and apparatus implementing service level agreements having these desirable attributes and overcoming these problems.

SUMMARY OF THE PREFERRED EMBODIMENTS

The foregoing and other problems are overcome, and other advantages are realized, in accordance with the following embodiments of the present invention.

In an embodiment of the invention, a signal-bearing medium tangibly embodies a program of machine-readable instructions executable by a digital processing apparatus of a computer system to perform operations for managing interactive specification of a new service level agreement to govern a contemplated service delivery. The following operations are performed when the program of machine readable instructions is executed by a digital processor: receiving a selection of a particular service level agreement; accessing a machine-readable electronic file corresponding to the selected particular service level agreement, the electronic file comprising at least a description of a graphical representation of the selected particular service level agreement for use by a graphical user interface of the computer system; displaying the graphical representation of the selected particular service level agreement on the graphical user interface of the computer system using the machine-readable electronic file, wherein the graphical representation displays an initial value of at least one service variable, an initial value of at least one service level attribute, and an initial value of a cost estimate for the contemplated service delivery; receiving a selection of a new value for the at least one service variable; receiving an updated value for the at least one service level attribute, wherein the updated value depends at least in part on the selected new value for the at least one service variable; receiving an updated value of the cost estimate for the contemplated service delivery, wherein the updated value of the cost estimate depends at least in part on the selected new value; and displaying the selected new value, the updated value, and the updated cost estimate in the graphical representation of the service level agreement.

In another embodiment of the invention a signal-bearing medium tangibly embodies a program of machine-readable instructions executable by a digital processor of a computer system to perform operations for managing the interactive specification of a service level agreement to govern a contemplated service delivery. The interactive specification is performed by a party to the contemplated service delivery. When the machine-readable instructions are executed the following operations are performed: receiving a request for a particular service level agreement over a network from a computer being operated by the party; accessing a machine-readable electronic file corresponding to the particular service level agreement requested, the electronic file comprising at least a description of a graphical representation of the requested particular service level agreement; transmitting the machine-readable electronic file corresponding to the requested particular service level agreement to the computer being operated by the party, wherein when the graphical representation of the requested particular service level agreement is displayed in a graphical user interface of a computer system, the graphical representation displays an initial value of at least one service variable, an initial value of at least one service level attribute, and an initial value of a cost estimate for the contemplated service delivery; receiving a selection of a new value for one of the at least one service variable or the at least one service level attribute; accessing a service delivery model that specifies a functional relationship among the at least one service variable, the at least one service level attribute and the cost estimate; using the service delivery model to determine an updated value for the one of the at least one service variable or the at least one service level attribute for which a new value was not selected, wherein the updated value depends at least in part on the selected new value for one of the at least one service variable or the at least one service level attribute; using the service delivery model to determine an updated value for the cost estimate of the contemplated service delivery; and transmitting the updated values for the one of the at least one service variable or the at least one service level attribute for which a new value was not selected and the cost estimate to the computer being operated by the party.

A further embodiment of the present invention concerns an electronic device for managing the interactive specification of a service level agreement to govern a contemplated service delivery. The electronic device comprises a memory for storing at least one computer program; a network interface for communicating with a computer being operated by a party to the service level agreement; and a digital processor coupled to the memory and network interface for executing the at least one computer program. When the digital processor executes the at least one computer program the following operations are performed: receiving a request for a particular service level agreement over a network from a computer being operated by the party; accessing a machine-readable electronic file corresponding to the particular service level agreement requested, the electronic file comprising at least a description of a graphical representation of the requested particular service level agreement; transmitting the machine-readable electronic file corresponding to the requested particular service level agreement to the computer being operated by the party, wherein when the graphical representation of the requested particular service level agreement is displayed in a graphical user interface of a computer system, the graphical representation displays an initial value of at least one service variable, an initial value of at least one service level attribute, and an initial value of a cost estimate for the contemplated service delivery; receiving a selection of a new value for one of the at least one service variable or the at least one service level attribute; accessing a service delivery model that specifies a functional relationship among the at least one service variable, the at least one service level attribute and the cost estimate; using the service delivery model to determine an updated value for the one of the at least one service variable or the at least one service level attribute for which a new value was not selected, wherein the updated value depends at least in part on the selected new value for one of the at least one service variable or the at least one service level attribute; using the service delivery model to determine an updated value for the cost estimate of the contemplated service delivery; and transmitting the updated values for the one of the at least one service variable or the at least one service level attribute for which a new value was not selected and the cost estimate to the computer being operated by one of the service customer and the service provider.

Yet another embodiment of the invention concerns an electronic device for use by a party to a contemplated service delivery to specify a new service level agreement to govern the contemplated service delivery. The electronic device comprises a memory for storing at least one computer program; a network interface for bi-directionally communicating over a network with a service level agreement manager; and a digital processor coupled to the memory and network interface. When the digital processor executes the at least one computer program the following operations are performed: receiving a selection of a particular service level agreement; transmitting a request for the particular service level agreement to the service level agreement manager over the network; receiving a machine-readable electronic file corresponding to the selected particular service level agreement, the electronic file comprising at least a description of a graphical representation of the selected particular service level agreement for use by a graphical user interface of the electronic device; displaying the graphical representation of the selected particular service level agreement on the graphical user interface of the electronic device using the machine-readable electronic file, wherein the graphical representation displays an initial value of at least one service variable, an initial value of at least one service level attribute, and an initial value of a cost estimate for the contemplated service delivery; receiving an updated value for the one of the at least one service variable or the at least one service level attribute for which a new value was not selected, wherein the updated value depends at least in part on the selected new value; receiving an updated value of the cost estimate for the contemplated service delivery, wherein the updated value of the cost estimate depends at least in part on the selected new value; and displaying the selected new value, the updated value, and the updated cost estimate in the graphical representation of the service level agreement.

In a still further embodiment of the invention a signal-bearing medium tangibly embodies a program of machine-readable instructions executable by a digital processing apparatus of a computer system to perform operations for selecting a service delivery implementation for use in managing a service delivery event. The following operations are performed when the program of machine-readable instructions is executed: detecting an ensuing service delivery event whereby a service will be delivered to a service customer by a service provider; retrieving data associated with a service level agreement regulating the ensuing service delivery event, wherein the data comprises at least one service variable; determining what value the at least one service variable will assume during the service delivery event; retrieving a service delivery model in dependence on the value that the service variable will assume during the service delivery event, wherein service will be provided during the service delivery event in accordance with the service delivery model.

Another embodiment of the invention concerns an electronic device to perform operations for selecting a service delivery implementation for use in managing a service delivery event. The electronic device comprises: a memory for storing at least one computer program; a network interface for communicating with a source of service level agreements over a network; and a digital processor coupled to the memory and network interface for executing the at least one computer program. When the at least one computer program is executed the following operations are performed: detecting an ensuing service delivery event whereby a service will be delivered to a service customer by a service provider; retrieving data associated with a service level agreement regulating the ensuing service delivery event from the source of service level agreements, wherein the data comprises at least one service variable; determining what value the at least one service variable will assume during the service delivery event; and retrieving a service delivery model in dependence on the value that the service variable will assume during the service delivery event, wherein service will be provided during the service delivery event in accordance with the service delivery model.

In a further embodiment of the invention a signal-bearing medium tangibly embodies a program of machine-readable instructions executable by a digital processing apparatus of a computer system to perform operations for measuring compliance of a service delivery event with terms of a service level agreement. When the program of machine readable instructions is executed by the digital processing apparatus, the following operations are performed: detecting a service delivery event; retrieving data associated with a service level agreement regulating the service delivery event, wherein the data concerns both an identity of at least one service variable specified in the service level agreement, and a plurality of target values specified for at least one service level attribute in the service level agreement, wherein each of the plurality of target values of the service level attribute is associated with a value that the at least one service variable may assume during a service delivery event; determining an actual value that the at least one service variable assumed during the service delivery event; selecting a particular target value for the at least one service level attribute on the basis of the actual value that the at least one service variable assumed during the service delivery event; determining a realized value for the service level attribute, wherein the realized value corresponds to a value actually achieved for the service level attribute during the service delivery event; and comparing the particular target value for the at least one service level attribute with the realized value for the at least one service level attribute to gauge compliance of the service delivery event with the service level agreement.

Yet another embodiment of the invention concerns an electronic device for measuring compliance of a service delivery event with a service level agreement. The electronic device comprises: a memory for storing at least one computer program: a network interface for bi-directionally communicating over a network with other entities; and a digital processor coupled to the memory and network interface. When the digital processor executes the at least one computer program stored in the memory the following operations are performed: detecting a service delivery event; retrieving data associated with a service level agreement regulating the service delivery event, wherein the data concerns both an identity of at least one service variable specified in the service level agreement, and a plurality of target values specified for at least one service level attribute in the service level agreement, wherein each of the plurality of target values of the service level attribute is associated with a value that the at least one service variable may assume during a service delivery event; determining an actual value that the at least one service variable assumed during the service delivery event; selecting a particular target value for the at least one service level attribute on the basis of the actual value that the at least one service variable assumed during the service delivery event; determining a realized value for the service level attribute, wherein the realized value corresponds to a value actually achieved for the service level attribute during the service delivery event; and comparing the particular target value for the at least one service level attribute with the realized value for the at least one service level attribute to gauge compliance of the service delivery event with the service level agreement.

Thus it is seen that the invention advantageously provides a more flexible way to specify service level attributes (manifest qualities associated with service delivery) so that service level attributes are responsive to the context of a service delivery event. The context of a service delivery event is characterized by service variables, or data describing circumstances surrounding a service delivery. The invention establishes functional relationships between service variables and service level attributes. An example of a service variable is the bandwidth available between the site at which the service is to be performed and the service provider's site; an example of a service level attribute is the worst-case elapsed time between the receipt of a service request and the completion of service delivery. In various embodiments of the invention, other service variables may include time of day, membership in a group, organizational affiliation, functional role of the user, the unique identifier of a device to which the service is delivered, the role of the device, and many other independent aspects associated with service delivery events. A particular advantage of the present invention is that different functional relationships may be specified between service level attributes and service cost on the one hand, and service variables on the other, for different values of service variables.

The systems and methods provided by the invention provide for direct selection of services and SLAs by one of a service customer and a service provider using a graphical user interface. The interactive interface of the present invention significantly eases the task of a service customer or service provider to understand the functional relationship between service variables and service level attributes. The invention facilitates the ability to play "what if?" by interactively allowing service customers and service providers to evaluate whether the value of the service is sufficient to justify its cost.

Another advantage of the invention is that it provides a new way for service providers and service customers to contract. In particular, in service level agreements created in accordance with the invention, the price a customer pays and the level of service that a customer receives varies depending on the service delivery context. The customer can agree to pay more, or to receive services in a less-responsive manner, or some combination thereof, if the context of service delivery makes it more difficult for the service provider to provide the service. In other words, a service customer can control cost by anticipating, and contractually providing for, various circumstances in which service may be delivered.

Another advantageous aspect of the invention is that it automatically determines how a service is to be provided, based on an identification of the service and a set of target service level attributes dependent on the context in which the service is to be delivered.

The system and method provided by the invention first evaluates the service variables characterizing the context in which the service is to be delivered. This context, together with the SLAs negotiated with the customer, both provide inputs to a choice among alternative implementations of a given service, including choosing parameters which will be given to the chosen implementation. It may be the case that the values of the relevant service variables imply conflicting SLAs—in that case, stored data embodying policies is used to determine the required service level. Once the implementation of the service and its parameters are known, the invention further uses stored information concerning the service implementation to provision the service: to identify, acquire and deploy the resources needed to deliver the service. Stored information also describes the sequence and flow of activities that make up the process by which the service is delivered.

A further aspect of the present invention comprises a novel way to monitor services whose committed service levels depend on the context in which the service is delivered, and to enforce the appropriate SLAs.

The system and methods provided by the invention evaluate the service variables characterizing the context in which the service is to be delivered. It may be the case that the values of the relevant service variables imply conflicting SLAs—in that case, stored data embodying policies is used to determine the required service level. As this context varies, the SLAs negotiated with the customer define acceptable ranges of service levels. The invention also monitors the service levels actually delivered.

In conclusion, the foregoing summary of the embodiments of the present invention is exemplary and non-limiting. For example, one of ordinary skill in the art will understand that one or more aspects or steps from one embodiment can combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 6A illustrates the relationship between values of the location service variable, service level and cost, in systems operating in accordance with the present invention;

FIG. 6B illustrates the relationship between values of the bandwidth service variable, service level and cost, in systems operating in accordance with the present invention;

DETAILED DESCRIPTION OF THE PREFERRED EMBODIMENTS

The invention can be embodied in several different ways, depending on the nature of the service provided and the context to which the supplied service level is responsive. Although the following description is set in the general domain of computer services, the invention is not so limited.

Figure 1:
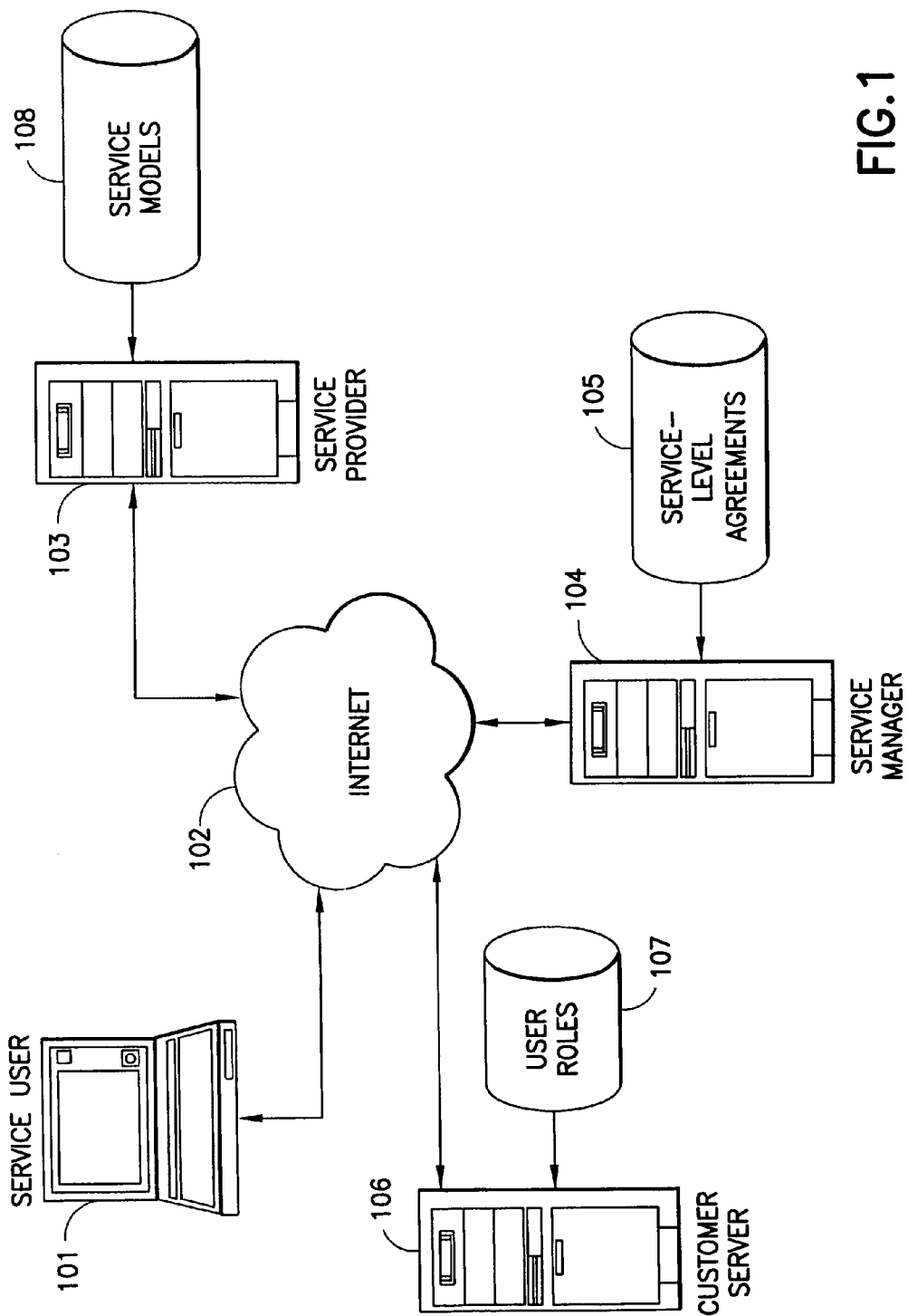
FIG. 1 is a block diagram depicting a computer system operating in accordance with the present invention.

FIG. 1 depicts the general configuration of a computer communications system within which the invention can be deployed. In FIG. 1, a service user's computer 101 is shown capable of communicating with the Internet 102. Computer-based services can be provided to the service user's computer 101 by service providers's computer 103 using the Internet 102 to convey data between the two computers. Service provider's computer 103 is shown equipped with persistent storage device 108 containing service models, about which more will be said later. The service manager's computer 104 is also capable of communicating with the Internet 102 for the purposes of monitoring both the level of service provided by service provider's computer 103 to the service user's computer 101, and also for determining the context in which these services will be provided. Service manager's computer 104 is provided with persistent storage 105 to store machine-readable service-level agreements.

Also shown in the figure is customer server 106 capable of communicating with the Internet 102. Customer server 106 is provided with persistent storage 107 shown storing user roles in the customer organization. The function of customer server 106 will be described presently.

Figure 2:
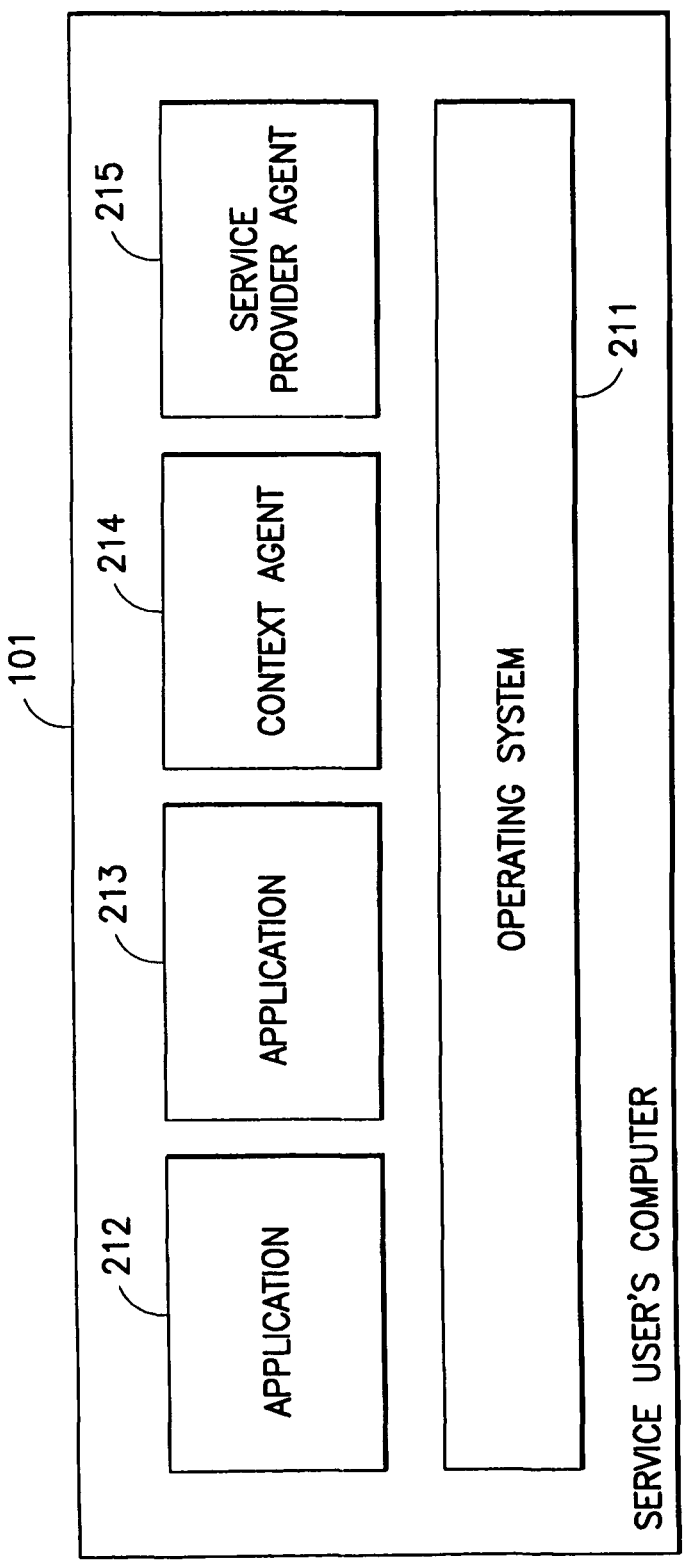
FIG. 2 is a block diagram depicting a software configuration in accordance with the invention for use in a computer of a service user.

Although an aspect of the present invention comprises means for the interactive specification and review of SLAs with dynamic service levels, it will be instructive to describe other aspects of the invention that concern the provision and monitoring of services delivered with dynamic service levels. FIG. 2 depicts the software configuration of the service user's computer, insofar as the components needed for the support of dynamic service levels are concerned. Service user's computer 101 contains an operating system 211, which may be Linux, or Microsoft Windows, or Macintosh OS, as required by the user. Operating system 211 supports application programs 212 and 213. Context agent 214 is also supported by operating system 211. The purpose of context agent 214 is to gather context information relevant to determining the appropriate service level at which the service is to be provided. Other components of context are available from Customer Server 106 of FIG. 1.

Context Agent 214 may be implemented under the Windows operating system as a service, also known as a process. For example, Context Agent 214 may start upon Windows startup and open a TCP/IP port to which it will listen for messages from Service Manager server 104 of FIG. 1. Service manager server 104 of FIG. 1 may send a message to this port, asking for one or more components of context, to which Context Agent 214 will respond with appropriate data. As an example, suppose that Service Manager 104 of FIG. 1 is currently managing a service to be delivered to the Service User's Computer 101, whose service-level agreement is responsive to the location of Service User's Computer 101. Then, Service Manager 104 of FIG. 1 will send a message to Context Agent 214 residing in Service User's computer 101, asking for that computer's current location. Context agent 214 will determine the current location of the Service User's Computer in which it currently resides and respond to Service Manager 104 of FIG. 1 with a message containing this location. Service Manager 104 may then contact Service Provider 103 of FIG. 1 so that the service can be provided in a manner responsive to the location of Service User's computer 101. The different manners in which services can be provided are stored as Service Models 108 of FIG. 1.

Context Agent 214 may use one or several methods to determine the location of the Service User's Computer in which it currently resides, such as information maintained by the Operating System 211, information available from an attached location-determining device, such as a Global Positioning Satellite receiver, or information gathered from the user of the Service User's Computer through some form of user interface, not shown.

As a second example, suppose that Service Manager 104 of FIG. 1 is currently managing a service to be delivered to the Service User's Computer 101, whose service-level agreement is responsive to the communication bandwidth available between Service User's Computer 101 and Service Provider 103 of FIG. 1. Then, Service Manager 104 of FIG. 2 will send a message to Context Agent 214 residing in Service User's Computer 101, asking for an estimate of this bandwidth. Context Agent 214 will determine the bandwidth and respond to Service Manager 104 of FIG. 1 with a message containing this bandwidth.

Context Agent 214 may use one or several methods to determine the communication bandwidth between the Service User's Computer in which it currently resides, and Service Provider 103 of FIG. 1. For example, Service User's Computer 101 of FIG. 1 may send a bandwidth-measuring packet to Service Provider 103 of FIG. 1, or may monitor communications link parameters, or may run a specialized test program to measure this bandwidth.

As a third example, suppose that Service Manager 104 of FIG. 1 is currently managing a service to be delivered to the Service User's Computer 101, whose service-level agreement is responsive to the current role of the user of Service User's computer 101 in the organization of which the user is a member. Then, Service Manager 104 of FIG. 1 will send a message to Context Agent 214 residing in Service User's Computer 101, asking for the user's identity. Context Agent 214 will determine the user's identity and respond to Service Manager 104 of FIG. 1 with a message containing this identity. Service Manager 104 of FIG. 1 may then query Customer Server 106 of FIG. 1 with this identity to determine the role that this user is currently playing in the organization of which the user is a member.

Context Agent 214 may use one or several methods to determine the identity of the current user of the Service User's Computer in which it currently resides. For example, Context Agent 214 may query the local Operating System 211 for the logon name of the user. Alternatively, in Service User's Computers equipped with a biometric user authentication facility, as in the IBM ThinkPad T42 model 266844U, the user identity may be obtained from that facility.

Also shown in FIG. 2 is a Service Provider Agent 215, whose purpose is to communicate with Service Provider computer 103 of FIG. 1 and implement commands and responses in accordance with the service provided.

It is one aspect of this invention to support the creation of SLAs for services, whose service levels are responsive to context. The issue here is twofold: first, in the negotiation of a specific SLA the needs of the service user must be met at an affordable cost. This means tradeoffs among the various terms of the SLA. The negotiator must be able to understand the impacts of these tradeoffs in terms of both cost and service level. The second issue is that the overall contract between the organization contracting for services on the one hand, and the service provider on the other, must meet budgetary constraints and must be deliverable by the service provider at the promised cost. Thus the subject invention is required to evaluate costs and explore tradeoffs.

Figure 3:
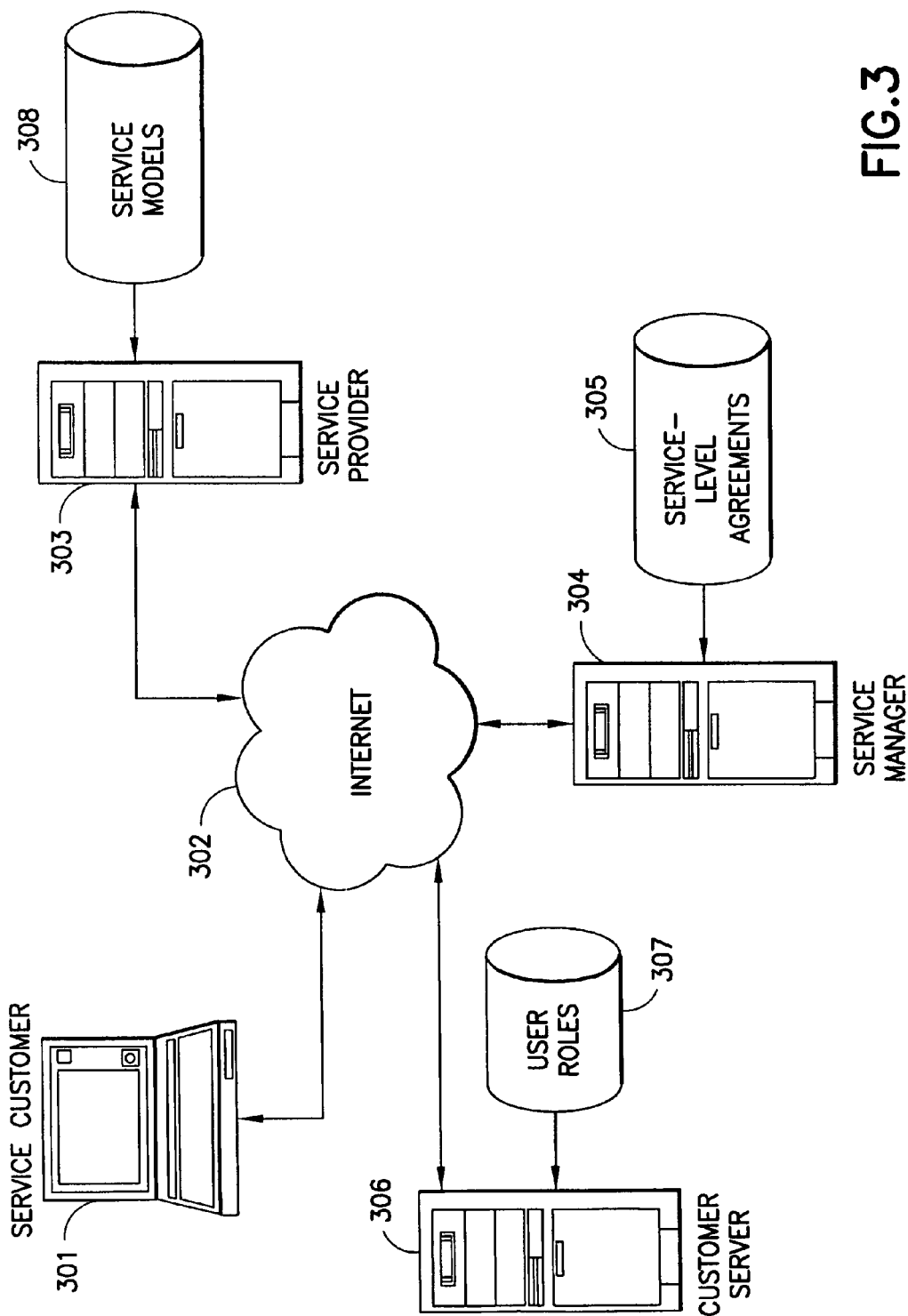
FIG. 3 is a block diagram depicting a computer system supporting service-level selection in accordance with the present invention.

FIG. 3 shows the configuration of a computer system capable of allowing a prospective service customer to select and review SLAs for services whose service levels may vary in accordance with the context in which the service is delivered. FIG. 3 is identical to FIG. 1, except that the role of the Service User has been replaced by that of the Service Customer. In operation, a prospective service customer would interact with Service Customer's computer 301 using, for example, a Web browser communicating with a Web Server residing in the Service Manager's computer 304. Software programs running in this Web service responsive to service customer interactions may communicate with Customer Server 306 to obtain user information 307 and may communicate with Service Provider computer 303 to obtain Service Models 308.

Figure 4:
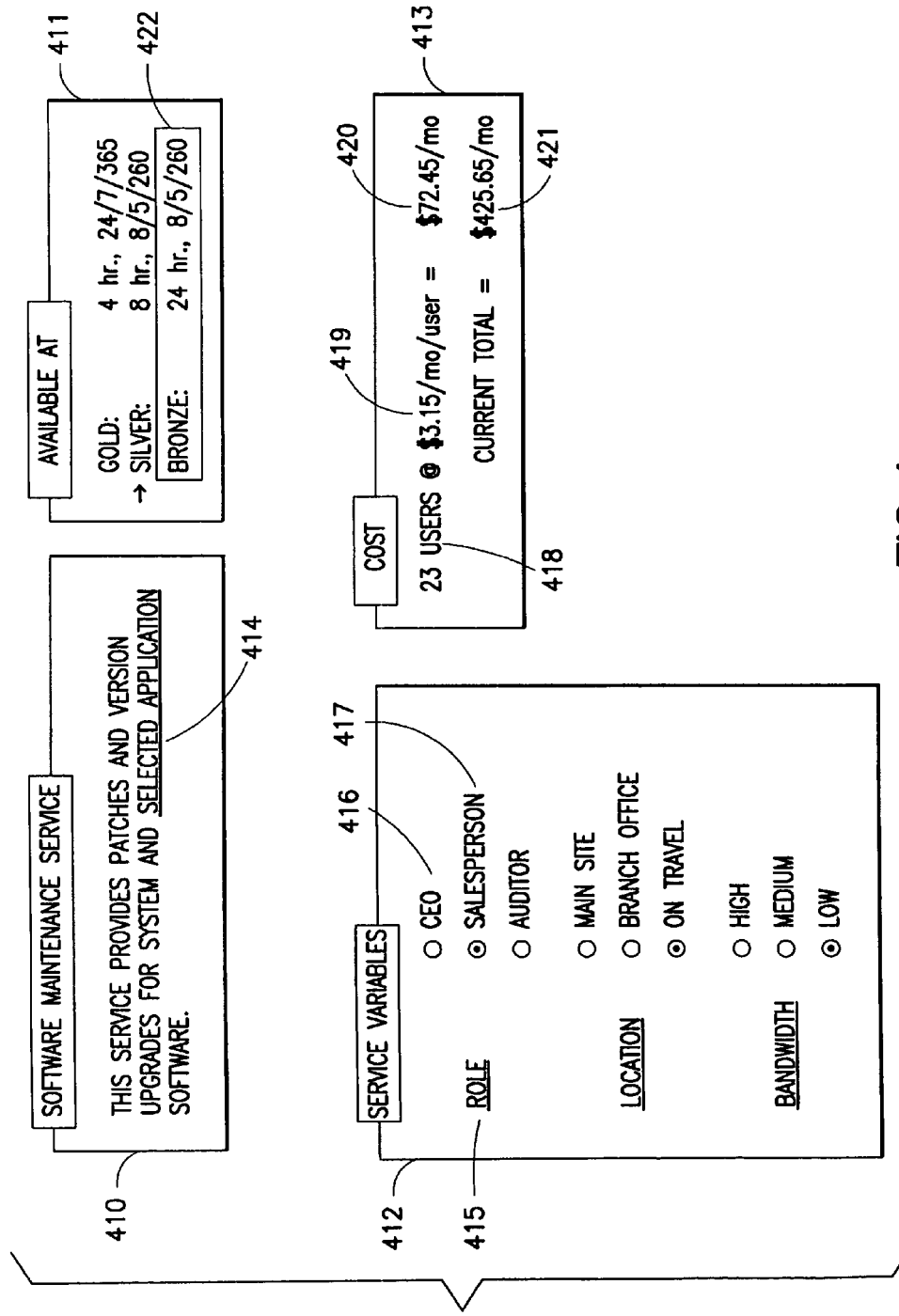
FIG. 4 depicts a graphical user interface permitting a prospective service customer to explore the effects of service variables in accordance with the present invention.

FIG. 4 shows an example user interface permitting a prospective service customer to explore the cost of a service provided with service levels and costs responsive to context. In this example, a prospective service customer is exploring the effects of service variables on users with the Salesperson role.

Block 410 names and describes the service. Note that in block 410 underlined element 414 indicates that by clicking on this element further information can be obtained. Block 411 is a concise listing of three SLAs, named Gold, Silver and Bronze, respectively. For example, Gold service guarantees four-hour response time from the time a patch or upgrade is available to the completion of its installation. Installation will be done at any time, day or night. The arrow to the left of Silver indicates that the base SLA for the Salesperson role is Silver, but for the given settings of service variables the service will be delivered to users in the Salesperson role at Bronze level—this is indicated by the selection box 422.

Block 412 lists categories and values of service variables. For example, element 415 is a category of service variables, and because it is underlined, further information can be obtained by clicking on it. Element 416 is a possible value of the Role service variable, not currently selected. Element 416 and 417 are examples of elements known in the art as "radio buttons." Only one radio button within a category can be selected.

Block 413 is a listing of costs. Within block 413, element 418 gives the current number of users of the software maintenance service whose role is Salesperson. Element 419 gives the monthly cost for the selected service variables. Elements 420 and 421 give total costs for the service and for the overall service contract, respectively.

Figure 5:
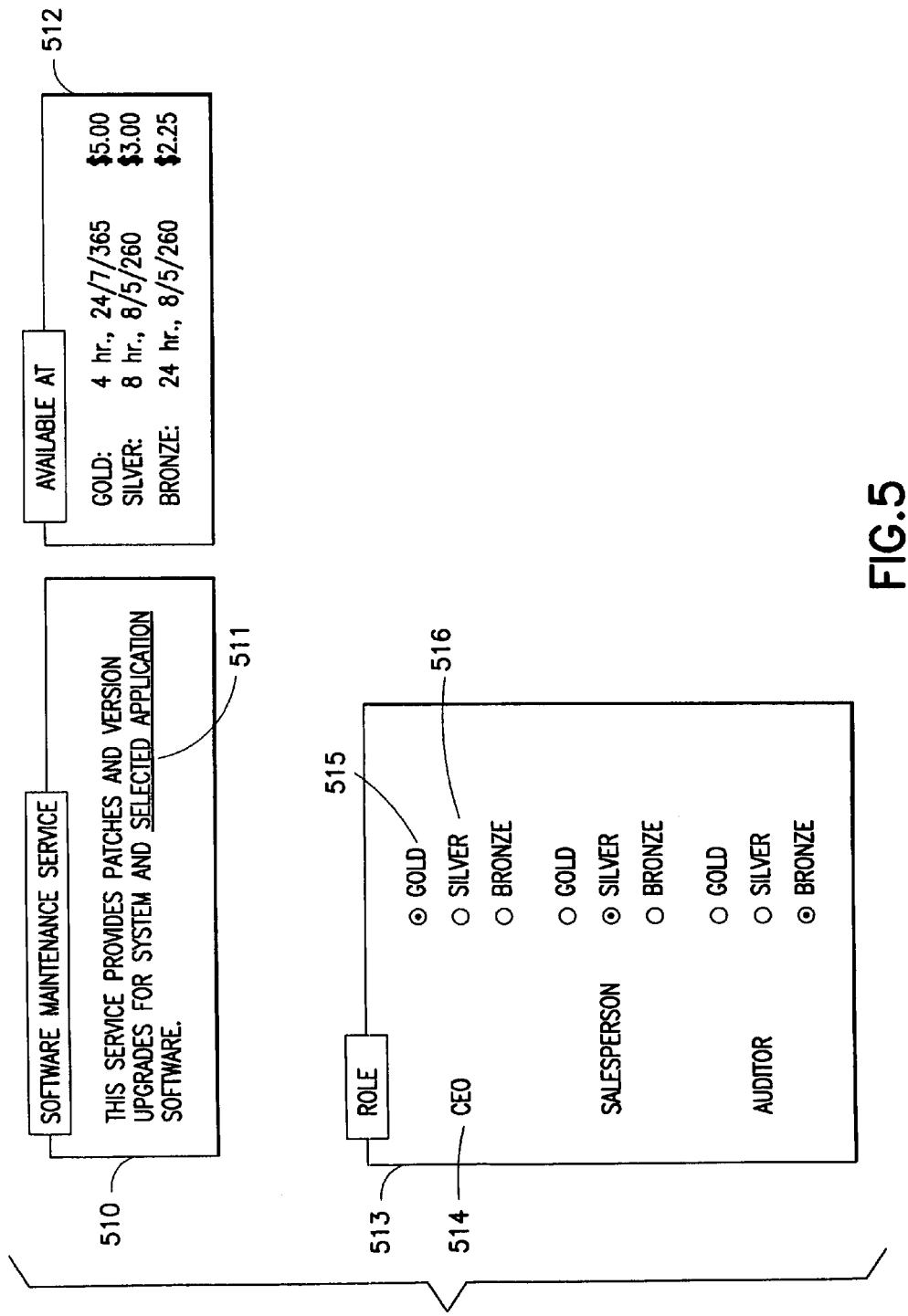
FIG. 5 depicts a graphical user interface permitting the selection of service levels by role in accordance with the present invention.

FIG. 5 depicts an example user interface for selecting service levels by role. Block 510 names and describes the service. Note that in block 510 underlined element 511 indicates that by clicking on this element further information can be obtained. Block 512 is a concise listing of three SLAs, named Gold, Silver and Bronze, respectively. For example, Gold service guarantees four-hour response time from the time a patch or upgrade is available to the completion of its installation. Installation will be done at any time, day or night. Gold service costs $5.00 per month per user.

Block 513 permits the prospective service customer to select the base service level of the service, by role. Element 514 is the name of one role, that of CEO. Element 515, a radio button shown selected, indicates the Gold service has been selected for the CEO role, while element 516, a radio button shown not selected, indicates that Silver has not been selected. Through use of this user interface it is possible to associate a "base" service level for the Software Maintenance Service with different organizational roles. Two roles may have the same service level. Note that FIG. 5 indicates that the base service level for the Salesperson role has been selected to be Silver. FIG. 4 indicates that Silver is the base service level for the Salesperson role, but that when the person in this role is traveling and has only a low bandwidth connection the service will be provided with only a Bronze level of service. It is intended that if element 415 of FIG. 4 is clicked, the user interface shown in FIG. 5 will be displayed.

FIG. 6A depicts an example of a component of a user interface used to show a prospective service customer the relationship between values of the Location service variable, service level and cost. Block 610 contains a table. Cell 611 of that table indicates that if the location to which the service is delivered is the Main site, there is no additional charge for the service, while cells 612 and 613 indicate that if the location to which the service level is delivered is a Branch office, there is a $0.50 surcharge for the service and it will be delivered with a service level one less than if the location is the Main site. For example, if as in the previous figures, a salesperson travels to a branch office, the service level delivered will be one grade less than Silver, or Bronze. Clicking on the underlined Location element of the Service Variables block 412 of FIG. 4 will display the user interface component shown in FIG. 6A.

FIG. 6B depicts an example of a component of a user interface used to show a prospective service customer the relationship between values of the Bandwidth service variable, service level and cost. Block 615 contains a table. Cell 616 of that table indicates that if the bandwidth available between the service provider and the computer to which the service is to be delivered is high, there is no additional charge for the service, while cells 617 and 618 indicate that if the bandwidth available between the service provider and the computer to which the service is to be delivered is medium, there is a $0.50 reduction in the cost of the service and it will be delivered with a service level one less than if the bandwidth is high. For example, if as in FIGS. 4 and 5, a salesperson connects to the Internet with a low-bandwidth connection, the service level delivered will be one grade less than Silver, or Bronze. Clicking on the underlined bandwidth element of the Service Variables block 412 of FIG. 4 will display the user interface component shown in FIG. 6B.

It will now be described how the service costs and service levels exemplified by service level 613 of FIG. 6A, service costs 611 and 612 of FIG. 6A, service level 618 of FIG. 6B and service costs 616 and 617 of FIG. 6B are automatically derived from information contained in Service Models 108 of FIG. 1. This automatic determination is advantageous so that the influences of certain service variables on cost and service level do not have to be maintained in a database that is separate from service models, but rather are derived from the service models themselves. Thus as service models evolve, through introduction of newer and better methods of service, the influences of certain service variables on cost and service level can be derived automatically.

Figure 7:
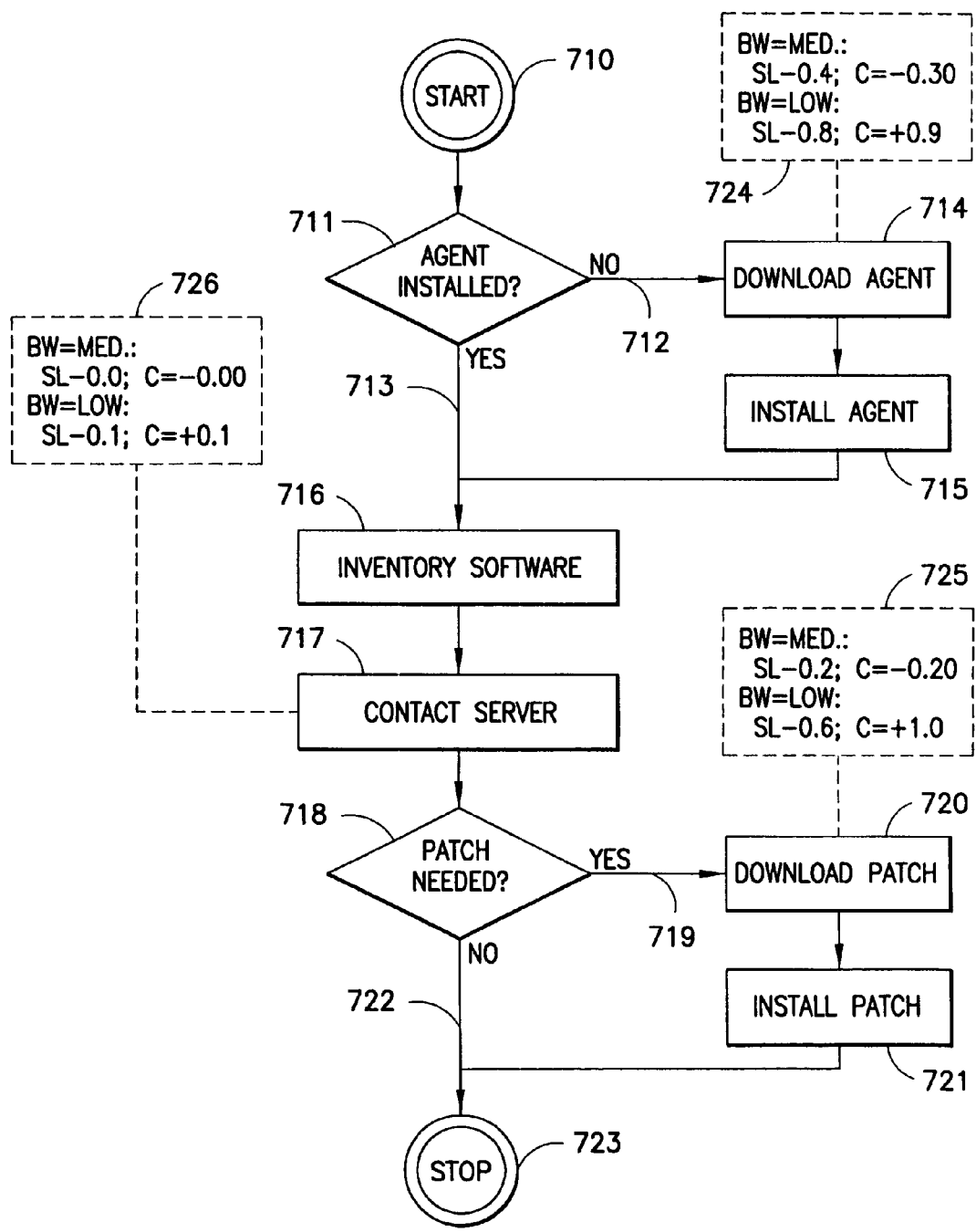
FIG. 7 is a flow chart depicting an exemplary patch process with annotations operating in accordance with the present invention.

FIG. 7 is a flow diagram of an exemplary service, that of patching software to remediate a problem or to add a new feature or function. Patching is not the object of this invention; rather, the patch process serves as an example of how the influence of service variables on cost and service level may be automatically determined from a service model. The process or service starts with start block 710. In decision block 711 it is determined whether or not a specific agent is installed on the computer whose software is to be patched. If it is installed, branch 713 it taken to block 716. If it is not installed, branch 712 is taken to block 714, wherein the agent software is downloaded from the service provider's server. Following the download, block 715 then installs the agent.

Block 716 then uses the facilities of the agent to perform a specific inventory of the software on the computer whose software is to be patched. Block 717 contacts the server to determine whether a patch is needed. Decision block 718 then analyzes the specific inventory to determine whether the specific patch is needed, based on the version number of the software installed and perhaps other factors. If the patch is needed, branch 719 is taken to block 720, which downloads the patch from the service provider's server. Following the download, block 721 then installs the patch, and the stop block 723 is then entered. If the patch is not needed, branch 722 is taken to stop block 723.

Also shown in FIG. 7 are three annotation blocks, 724, 725 and 726. These annotation blocks contain additional data about a specific process step. Block 724 contains additional data concerning block 714; block 725 contains additional data concerning block 720 and block 726 contains additional data concerning block 717. Each of blocks 714, 717 and 720 concern process steps that are bandwidth sensitive, and these are the only blocks in FIG. 7 that do. The annotation blocks describe the contribution to service level and cost based on bandwidth, for the associated block. For example, block 724 concerns block 714 and describes the incremental contribution of block 714 to cost and service level, as a function of bandwidth. In particular, block 724 asserts that block 714 contributes to a degradation in service level of 0.4 of one full level, and to a reduction in service cost of 30 cents, if the available bandwidth between the site at which the service is provided and the service provider's computer is not high, but medium. It the available bandwidth is low, block 714 contributes to nearly a full level of service degradation (0.8) and an increase in cost of 90 cents.

Note that when a process is designed from specific process steps, only those steps that are affected by a given service variable need be annotated. In the example of FIG. 7, only the process steps represented by blocks 714, 717 and 720 need be annotated because all of the other blocks do not involve significant communication between the site at which the service is provided and the service provider's computer.

The process of FIG. 7 can be represented in computer-readable form in many ways, including as an XML document in a specific dialect of XML known as BPEL4WS. IBM has published a draft standard for this dialect on the Internet at ftp://www6.software.ibm.com/software/developer/library/ws-bpel.pdf. The draft standard permits the dialect to be extended; for example, by including the annotation in blocks 724, 725 and 726 of FIG. 7. Programs exist for the interpretation and processing of BPEL4WS, for example the IBM product program WebSphere Business Integration Server Foundation V5.1. The invention augments this processing in accordance with the flow diagram depicted in FIG. 8.

It is to be appreciated that other representations of a service process than that of BPEL4WS can be accommodated by the invention.

Figure 8:
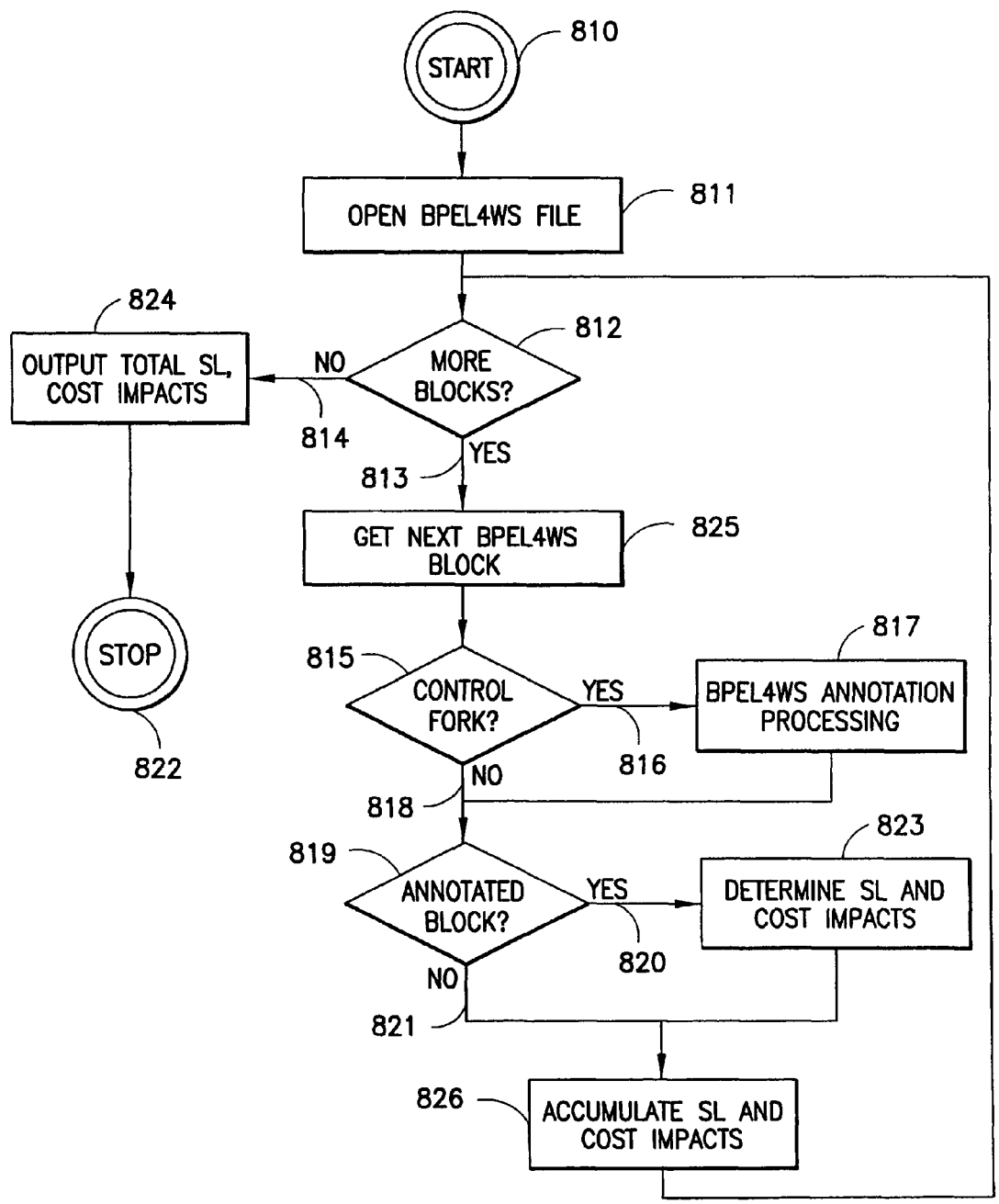
FIG. 8 is a flow chart depicting an analytic process for annotated BPEL4WS by which service-level and cost impacts are determined from those annotations, in systems and methods operating in accordance with the present invention.

FIG. 8 illustrates the process by which total impacts on service levels and costs are computed from an annotated BPEL4WS description of a service process, such as that of FIG. 7. In FIG. 8, the process begins with start block 810.

Block 811 then opens the BPEL4WS file for processing. Decision block 812 then tests to see if there are any more blocks in the file to process. If there are not, branch 814 is taken to block 824, which outputs the total impact on service level and cost of the given service variable. If there are, branch 813 is taken to block 825, which gets the next BPEL4WS block from the file. Decision block 815 then tests the current BPEL4WS block to see if it is a decision block, and if it is, branch 816 is taken to block 817, which will be described presently. If it is not, branch 818 is taken to decision block 819. Decision block 819 then tests to see if the current block is annotated. If it is not, branch 821 is taken to block 826. If it is an annotated block, branch 820 is taken to block 823, which examines the annotation and determines its service-level and cost impacts.

Block 817 represents the processing illustrated in FIG. 8. That is, block 817 represents a recursive invocation of the subject process. This invocation produces accumulated service level and cost impacts for one of the paths of a BPEL4WS decision block. When block 817 completes it represents an analysis of one of the paths through the BPEL4WS process.

The function of block 825 is to summarize service-level and cost impacts for the processing of the BPEL4WS file, at the current level of completion of that processing. Block 825 receives results computed in block 817 and in block 823. There are several ways of summarizing these results. In a first way, the summary consists of the sum of past impacts plus the maximum of the impacts discovered in blocks 817 and 823. If the service-level impact resulting from one block is greater than that resulting from the other block, but the cost impact is less, then a composite impact is computed consisting of the maximum of the service-level impacts and the cost impacts. This is a conservative estimate that makes no assumptions about which way the decision modeled by block 815 will go. Alternatively, if historical information is available about which is the most likely path taken as a result of the BPEL4WS decision block encountered by block 815, that information may be taken into account. For example, if it is known that if the control fork is taken 90% of the time, a composite service-level and cost impact can be computed from the separate impacts as the weighted sum.

It may be the case that the service-level and cost impacts of choosing one path in the BPEL4WS block will conflict with the service-level and cost impacts of choosing another path. One mechanism that can be employed to resolve this conflict in the computation of summary impacts is the use of policy rules. Policy rules are described in "Prioritized Conflict Handling for Logic Programs", in: Proceedings of the International Symposium on Logic Programming (ILPS-97), edited by Jan Maluszynski, MIT Press, Cambridge, Mass., USA, pages 197-211. An implementation of a rules-based language, CLP, is available from IBM at http://www.alphaworks.ibm.com/tech/commonrules.

The result of the processing of FIG. 8 is a total service level and cost impact analysis of the process represented by the BPEL4WS file. As an example, consider FIG. 7. The analysis of FIG. 8 will produce a total service level impact of 0.6 and a total cost impact of negative 50 cents for medium bandwidth, and a total service level impact of negative 1.5 and a total cost impact of two dollars for low bandwidth. These figures are reflected in FIG. 6B, where the service level impact of medium bandwidth has been rounded up to one service level (cell 68) and the service level impact of low bandwidth has been rounded up to two service levels.

As a second embodiment of the invention, rather than base the calculation of actual service level and costs upon an annotated service model as has been previously described, it may be advantageous to specify this computation as a set of rules, each constraining one or more service attributes. For example, one rule may specify that for a given service a group always receives that service with a given attribute. A second rule may specify that at a certain time period during the day the service is provided with a different attribute. A third rule may specify that there is a degradation in service level when the bandwidth between the site at which service is to be provided and the site at which the service provider's computer is located is low. It will be found advantageous to associate an optional priority with rules, such that if the value of a certain attribute would be determined in a conflicting way by more than one rule, the rule with the highest priority determines the value of the attribute.

It is to be noted that the result of this computation may be that with the given service variable values, the service cannot be delivered.

The computation is straightforward, and may be implemented in a number of ways. It may be implemented as a computer program, for example a computer program containing one or more switch statements, as in the Java programming language. Each clause represents a specific service level target that applies to the situation represented by the switch variable. Thus the computation can be modeled as a first computation to determine the value of a switch variable, a second computation consisting of one or more case statements, and a final computation to output the specific service level target. Alternatively, the computation may be effectively implemented using a rule- or constraint-based programming system, such as described in "CONSTRAINTS—A Language for Expressing Almost-Hierarchical Descriptions," G. L. Steele and G. J. Sussman, Artificial Intelligence (14) pp. 1-39 (1979) and many others.

It is to be appreciated that the embodiments described herein are not exhaustive; nor are the service variables in the examples. In the case of a service variable being the time of day, for example, the user interface for selecting a value of the service variable would differ in detail but not in concept from that of FIG. 4. The prospective customer would be presented with choices concerning the time of day as the value of a service variable, and would be presented with service levels and costs as responsive to that time of day.

It may be the case that the service in question is delivered to a computing device which performs a function that does not involve a user. Examples of such devices include file and print servers, application servers and other infrastructure elements, devices which function on an assembly line, and the like. For such devices, service variables such as location, bandwidth and user role are not part of the context in which a service is delivered. Rather, a uniquely important service variable concerns the priority of the work currently being performed by such a device. If a print server is currently printing a copy of a manual, this work may be less important to the immediate needs of the business than if the print server is printing the camera-ready copy for the annual report. It is to be appreciated that the priority of work may vary from moment to moment, and thus the customer may wish that certain critical services be delivered with service levels that also vary from moment to moment. Certain device may be designated as devices of preference; this designation implies the need for better service levels, and thus device preference may also be the value of a service variable.

It is seen that the concept of a service variable is uniquely valuable to enterprises and organizations whose use of computing devices varies in accordance with business need. The invention described herein permits customers of services responsive to service variable to explore and to understand their effect on the services they pay for.

Figure 9:
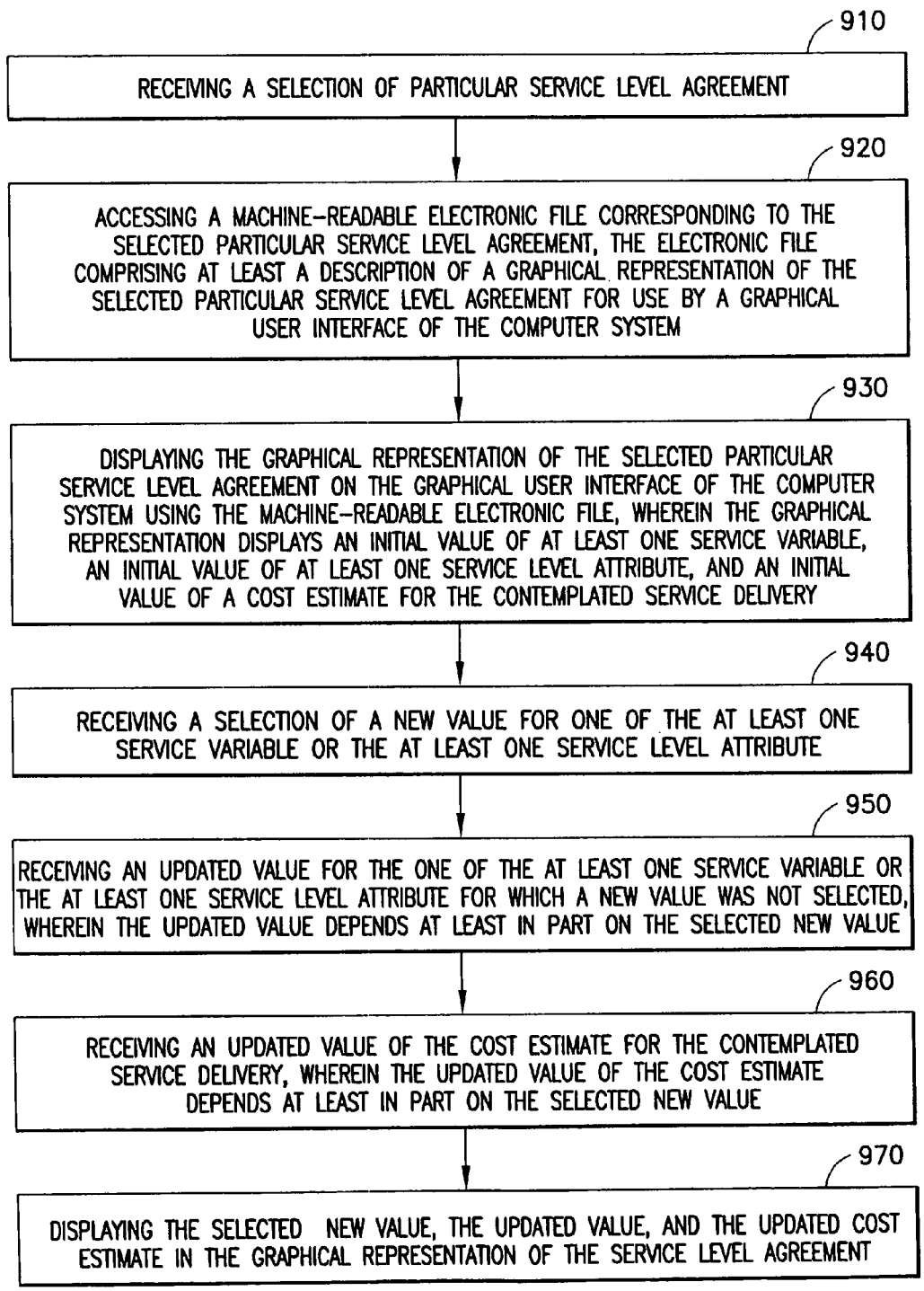
FIG. 9 is a flow chart depicting steps of a method operating in accordance with the present invention.
Figure 10A:
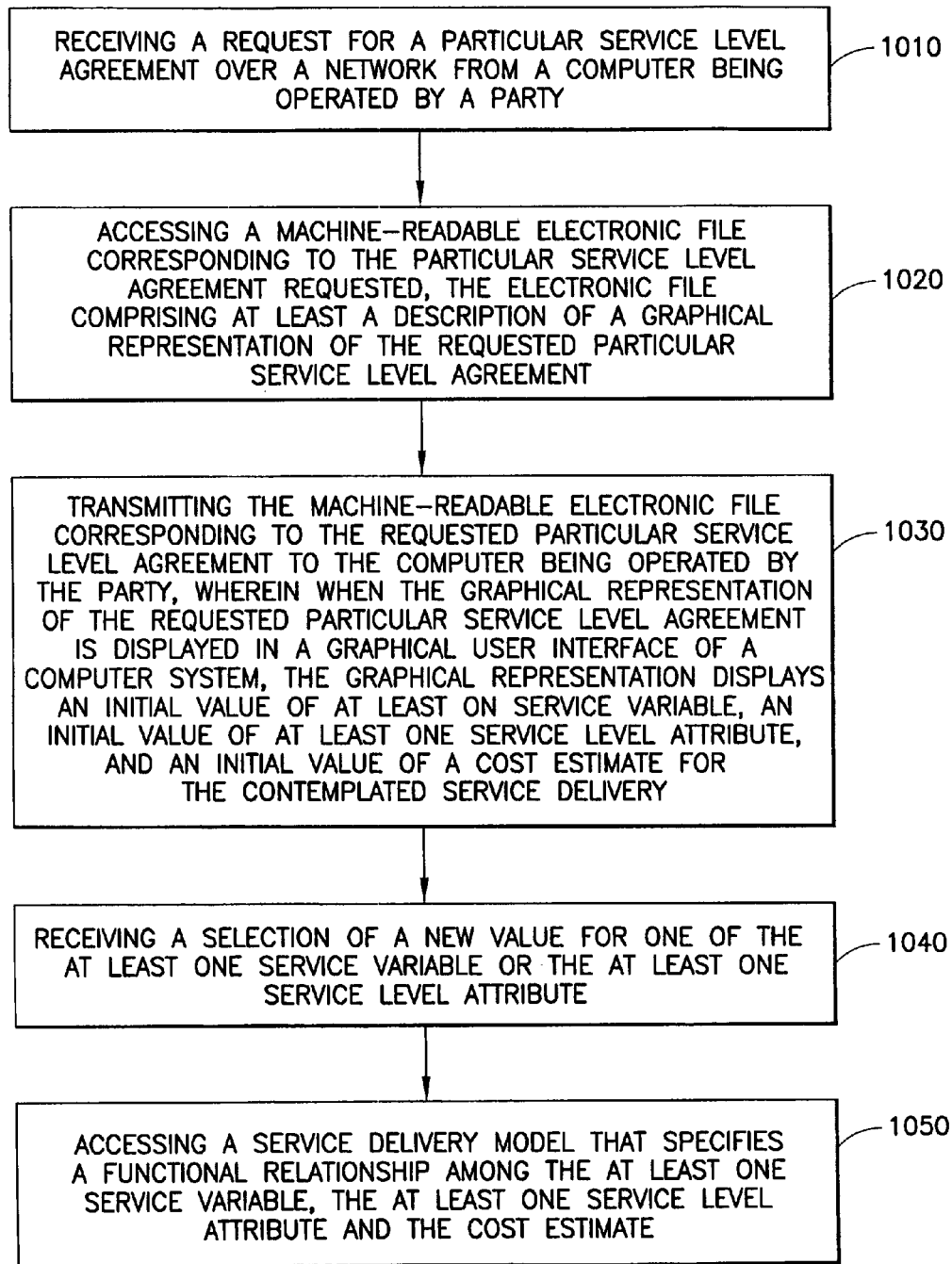
FIGS. 10A-10B are flow charts depicting steps of a method operating in accordance with the present invention.
Figure 10B:
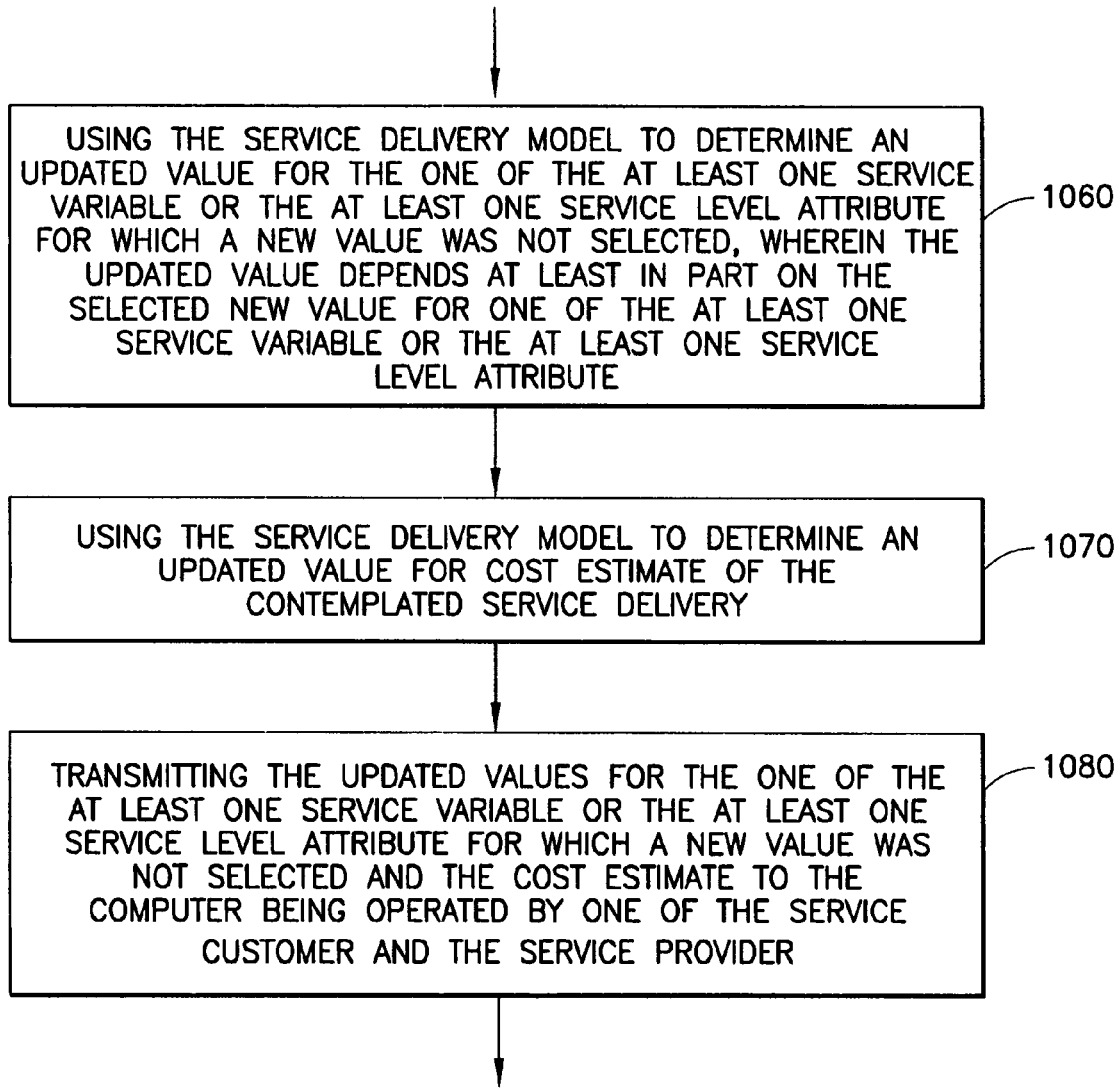

FIGS. 9 and 10A-10B are flow charts summarizing methods for implementing the first aspect of the present invention. FIG. 9 depicts a method suitable for incorporation in a computer 301 used by a service customer, or in other embodiments, a service provider, to interactively specify a service level agreement. The computer 301 is comprised of at least a computer memory; a network interface for facilitating bi-directional communication over the network; and a digital processor coupled to the computer memory and network interface.

In step 910, the computer 301 receives a selection of a particular service level agreement from one of a prospective service customer or a prospective service provider. It is understood that the teachings of the invention can be applied with advantage by either or both of service customers and service providers to interactively specify service level agreements. The particular service level agreement sought is a template that will function as a starting point in specifying a service level agreement. At step 920, the digital processor of the computer 301 performs a step to access a machine-readable electronic file corresponding to the selected particular service level agreement. In a preferred embodiment, the machine readable electronic file comprises at least a description of a graphical representation of the selected particular service level agreement for use by a graphical user interface of the computer 301. Then, at step 930, the computer system 301 displays the graphical representation of the selected particular service level agreement on the graphical user interface of the computer system using the machine-readable electronic file. The graphical representation displays an initial value of a service variable, a service level attribute, and a cost estimate for the contemplated service delivery. One of ordinary skill in the art will understand that the initial values can correspond to actual values determined possibly by use of a context agent; to zero values; or to blanks where values specified by a user will go. The service variable is an independent variable corresponding to for example, a user-specified aspect of service delivery or a resource required for service delivery. The service level attribute corresponds to a quality associated with the contemplated service delivery, and may correspond either to a numerical value or to a name that subjectively describes the level of service (such as, for example, "first class"; "second class": etc.). The value of both the service level attribute and cost estimate depends, at least in part, on the value of the service variable.

Next, at step 940, the computer receives from one of the service customer or service provider a selection of a new value for one of the at least one service variable or the at least one service level attribute. One of ordinary skill in the art will understand that in the present invention the at least one service level attribute is generally determined by the service variable, so that a user of the method would ordinarily specify the service variable first to see what effect varying values of the at least one service variable have on the at least one service level attribute and cost estimate. In other embodiments of the invention, though, the user can specify the at least one service level attribute and the method will "back out" the minimum level of the service variable necessary to achieve the selected at least one service level attribute. Other methods of determining the at least one service variable from the at least one service variable are possible such as, for example, determining the at least one service variable on a least-cost-of-service basis. Following the method, then, at step 950, the computer receives an updated value for the one of the at least one service variable or the at least one service level attribute for which a new value was not selected, wherein the updated value depends at least in part on the new value selected for either the at least one service variable or the at least one service level attribute. Next, at step 960, the computer 301 receives an updated value of the cost estimate for the contemplated service delivery, wherein the updated value of the cost estimate depends, at least in part, on the selected new value. Then, at step 970, the computer system 301 displays the selected new value, the updated new value, and the updated cost estimate in the graphical representation of the service level agreement.

A particular advantage of the present invention is that a prospective service customer or service provider can continue specifying values until a desired combination of values for the service variable, service level attribute and cost estimate are achieved. In such a situation, the operations of receiving a selection of a new value; receiving an updated value; receiving an updated cost estimate and displaying the selected new value, the updated value and the updated cost estimate are repeated until a combination of an acceptable value for the at least one service variable, an acceptable value for the at least one service level attribute, and an acceptable value for the cost estimate are identified.

In embodiments where the method is also used to negotiate binding service level agreements, additional steps are performed, wherein the steps further comprise: receiving from the party (the party may be a prospective service customer or a service provider) an indication that the selected particular service level agreement and the combination of the acceptable value for the at least one service variable, the acceptable value for the at least one service level attribute and the acceptable value for the cost estimate form a service level agreement acceptable to the party; and transmitting the indication to the other party to the contemplated service delivery.

If the other party finds the terms acceptable, a confirmation is received from the other party indicating that the particular service level agreement and the combination of the acceptable value for the at least one service variable, the acceptable value for the at least one service level attribute and the acceptable value for the cost estimate form an agreed-to service level agreement which will bind the prospective parties during a service delivery event.

In alternate embodiments of the present invention for use by a service provider, the method depicted in FIG. 9 further displays an initial value of a service provider cost estimate, wherein the service provider cost estimate represents the cost to the service provider of delivering service to a service customer at the initial value of the at least one service variable and the initial value of the at least one service level attribute. In this embodiment additional operations are performed comprising: receiving an updated value for the service provider cost estimate, wherein the updated value of the service provider cost estimate depends at least in part on the selected new value of the at least one service variable; and displaying the updated value for the service provider cost estimate.

FIGS. 10A-10B depict steps of a method that may be implemented in a service manager 304 and possibly a service provider 303 operating in accordance with the present invention. In addition to elements already described, the service manager 304 and service provider 303 each comprise at least a computer memory for storing at least one computer program for performing operations in accordance with the present invention; a network interface allowing bi-directional communication over a network with the other entities depicted in FIGS. 1 and 3; and a digital processor coupled to the computer memory and network interface for executing the at least one computer program stored in the computer memory.

In the method depicted in FIGS. 10A-10B, at step 1010 the service manager 304 receives a request for a particular service level agreement over a network from a computer being operated by one of a service customer or a service provider. Then, at step 1020, the service manager accesses a machine-readable electronic file corresponding to the particular service level agreement requested, the electronic file comprising at least a description of a graphical representation of the requested particular service level agreement. Next, at step 1030, the service manager 304 transmits the machine-readable electronic file corresponding to the requested particular service level agreement to the computer being operated by one of the service customer or the service provider. When the graphical representation of the requested particular service level agreement is displayed in a graphical user interface of a computer system, the graphical user representation displays an initial value of at least one service variable; an initial value of at least one service level attribute; and an initial value of the cost estimate for the contemplated service delivery. The at least one service variable is an independent variable corresponding to at least one of a user-specified aspect of service delivery and a resource required for service delivery. The at least one service level attribute corresponds to a quality associated with the contemplated service delivery. In typical situations, the initial value of both the at least one service level attribute and cost estimate depend, at least on part, on the initial value of the at least one service variable.

Then, at step 1040, the service manager 304 receives a selection of a new value for one of the at least one service variable or the at least one service level attribute, typically from the user computer 301 over the network. Next, at step 1050, the service manager accesses a service delivery model from service provider 303, although other arrangements in accordance with the invention are possible. The service delivery model specifies a functional relationship among the at least one service variable, the at least one service level attribute and the cost estimate. Then, at step 1060, the service manager 304 uses the service delivery model to determine an updated value for the one of the at least one service variable or the at least one service level attribute for which a new value was not selected. The updated value depends at least in part on the selected new value for one of the at least one service variable and the at least one service level attribute. Next, at step 1070, the service manager uses the service delivery model to determine an updated value for the cost estimate of the contemplated service delivery. Then, at step 1080, the service manager 304 transmits the updated values for the one of the at least one service variable and the at least one service level attribute not selected and the cost estimate to the computer system being operated by one of the service customer and the service provider.

Figure 11:
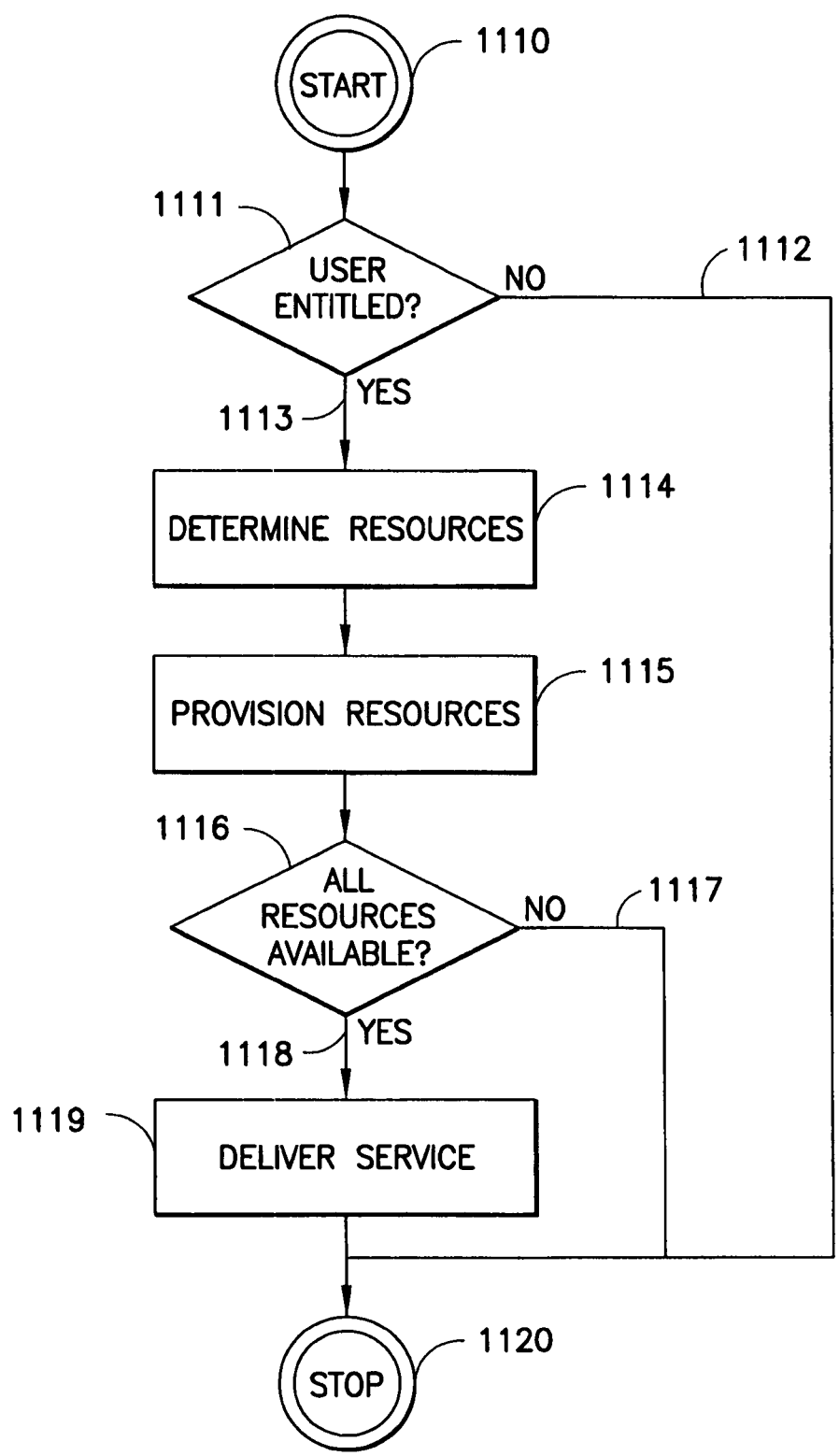
FIG. 11 is a flow chart depicting steps performed to select a service model for the delivery of a service in systems and methods operating in accordance with the present invention.

Another aspect of the present invention concerns the provisioning of resources necessary to deliver a service, wherein the service delivery is made in accordance with service level agreements. FIG. 11 shows an overall flow diagram for the provision of services whose service levels may be responsive to the context in which the service is delivered. This flow diagram is generic to the provision of services, but the definitions of some of the blocks in the figure are novel. Service provision starts with the start block 1110. The decision block 1111 tests to see if the requester of the service, the service user, is entitled to have the service delivered. This information is available from the service-level agreements data 105 of FIG. 1. If the requestor is entitled to the service, branch 1113 is taken to block 1114, which determines the resources needed to deliver the service. The processing performed in block 1114 will be detailed presently. Block 1115 then provisions the necessary resources. Decision block 1116 tests to see if all of the needed resources were provisioned and, if not, branch 917 is taken to stop block 1120. If so, block 1119 delivers the service. The processing in blocks 1114 and 1115 forms the content of the subject invention.

Figure 12:
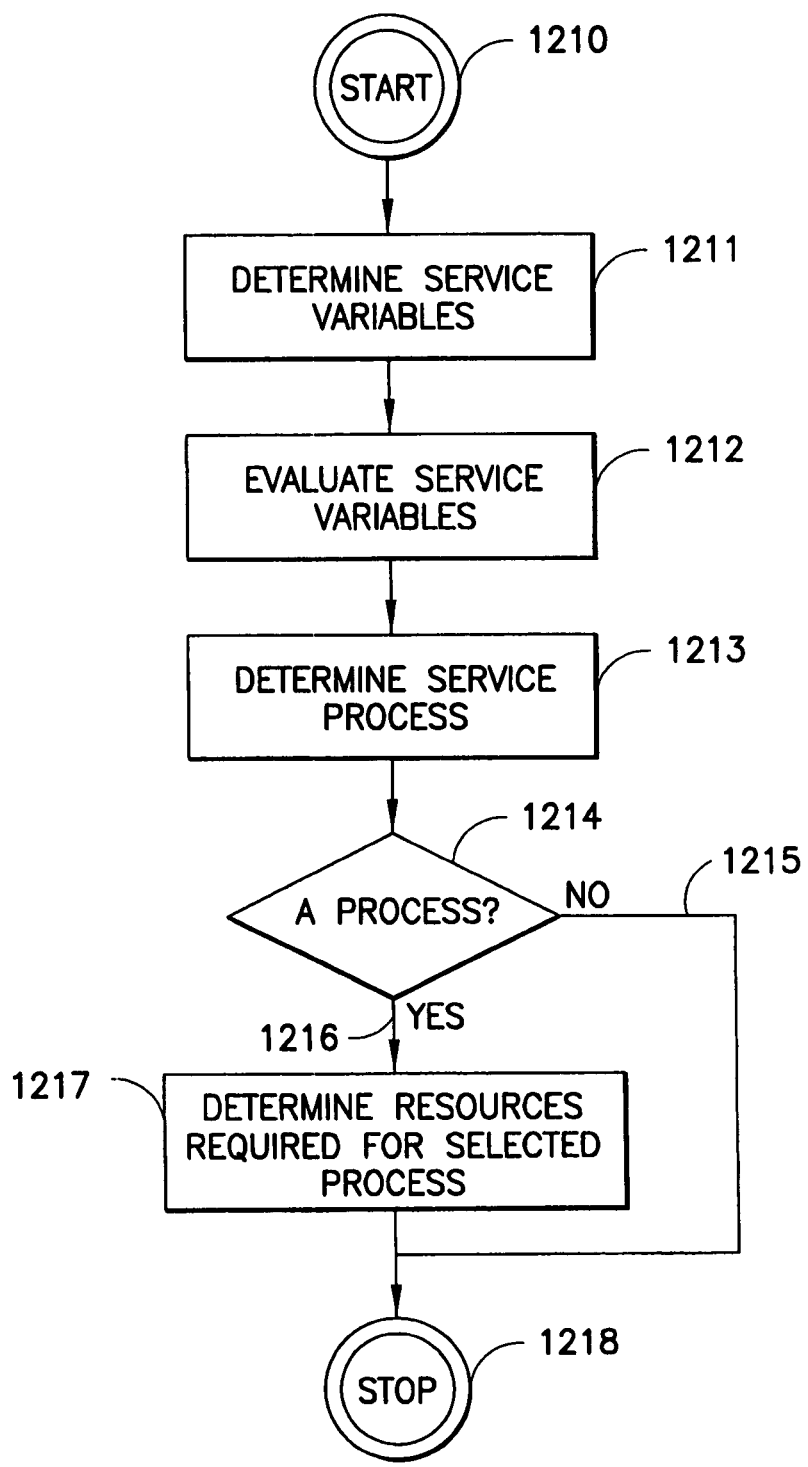
FIG. 12 is a flow chart depicting steps performed to determine resources needed to deliver a service in systems and methods operating in accordance with the present invention.

FIG. 12 shows the processing performed in block 1114 of FIG. 11. This processing begins with start block 1210, and continues with block 1211, where the service variables that are relevant to the service to be supplied are determined. For example, for the patch process (FIG. 7) the bandwidth of the communications path between the computer to be patched and the service provider's server is the relevant service variable. The service variables relevant to a service are stored in the service models data 108 of FIG. 1. If these service models are stored in a relational database such as the IBM Universal DB2 database, then the service variables can be determined through an SQL query to this database.

Once the service variables are known, means are employed to determine the current value of these service variables. For example, context agent 214 of FIG. 2 may consist of software that can estimate the bandwidth of the communication path between the computer to be served and the service provider's server. Thus the processing in block 1212 may consist of enumerating all of the relevant service variables and activating means by which each and every relevant service variable is evaluated and reported.

Block 1213 is now responsible for determining the process by which the service is to be provided, given values for all of the relevant service variables. The processing in block 1213 is detailed further in FIG. 13.

Figure 13:
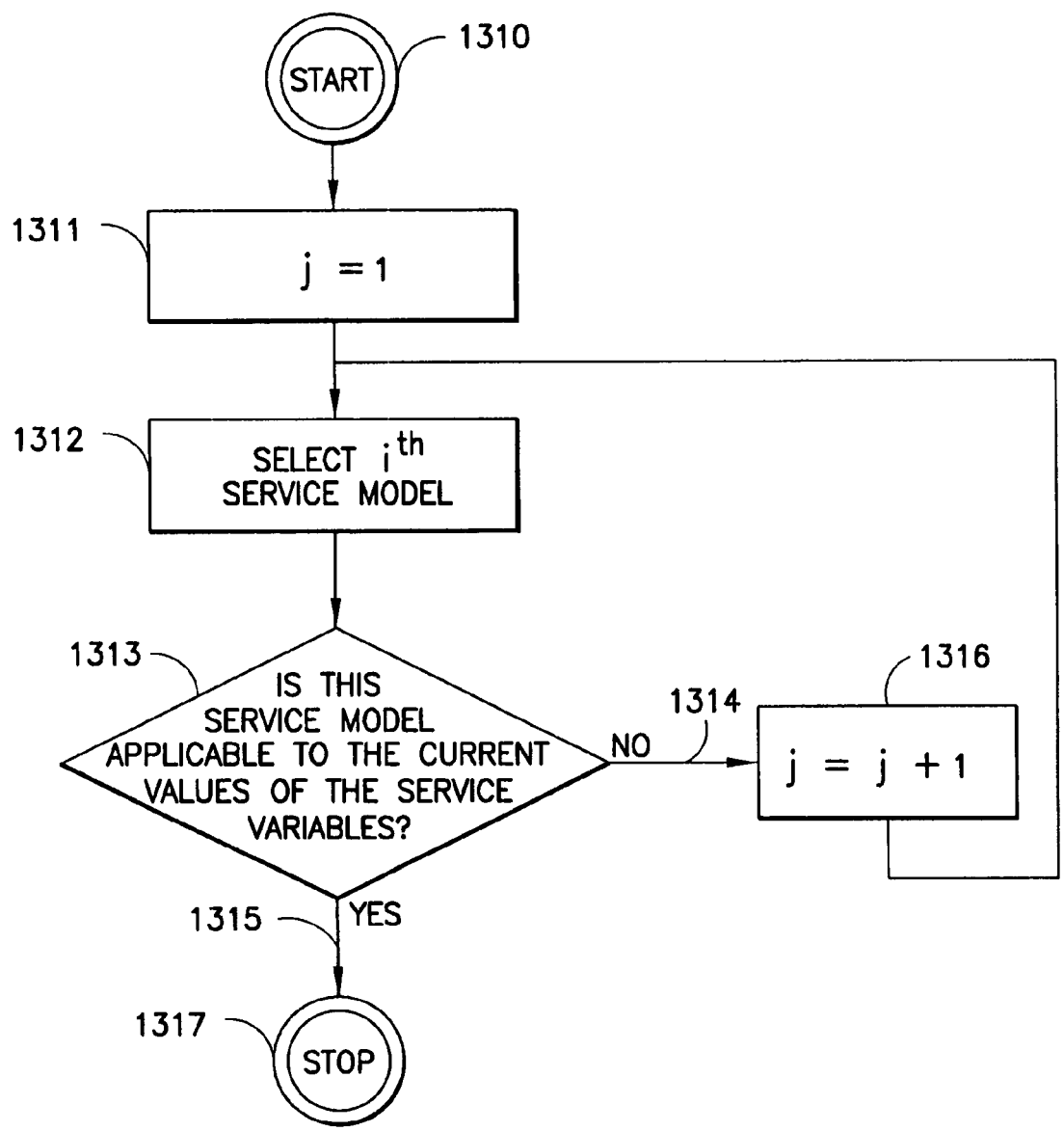
FIG. 13 is a flow chart depicting steps performed to select a service model for the delivery of a service in systems and methods operating in accordance with the present invention.

The processing in FIG. 13 begins with start block 1310 and continues with block 1311, in which an index j is initialized to one. Block 1312 is then entered, wherein a service model, from service models data 108 of FIG. 1, is selected. If these service models are stored in a relational database such as the IBM Universal DB2 database, then the first and subsequent service models can be determined through an SQL query to this database. Decision block 1312 examines the selected service model to see what range of service variables the model is applicable to. The model may represent a range of values for each relevant service model, and these ranges can be used to determine whether this service model can provide services in a context characterized by a particular set of values of the relevant service variables. If the model is applicable, branch 1315 is taken to stop block 1317, and an applicable model has been determined. If the model is not applicable, branch 1314 is taken to block 1316, where the index j is incremented to select the next model.

It is to be appreciated that the process described in FIG. 13 is one of generic form of a serial search through the various service models for the given service. Serial search takes a number of steps that is linear in the number of alternatives. An alternate form for this processing is suggested by noting that the various service variables, taken together, may be thought of as a multidimensional space, one dimension for each service variable. The set of current values of the service variables can be thought of as a point in this multidimensional space. The ranges of values of the service variables for which each service model is appropriate form regions in this multidimensional space. Thus the problem of determining an appropriate service model reduces to determining which region of the multidimensional space holds the point corresponding to the current values of the service variables. This problem can be solved by representing the multidimensional spaces as a tree, where each level in the tree corresponds to a decision concerning a single service variable.

Figure 14:
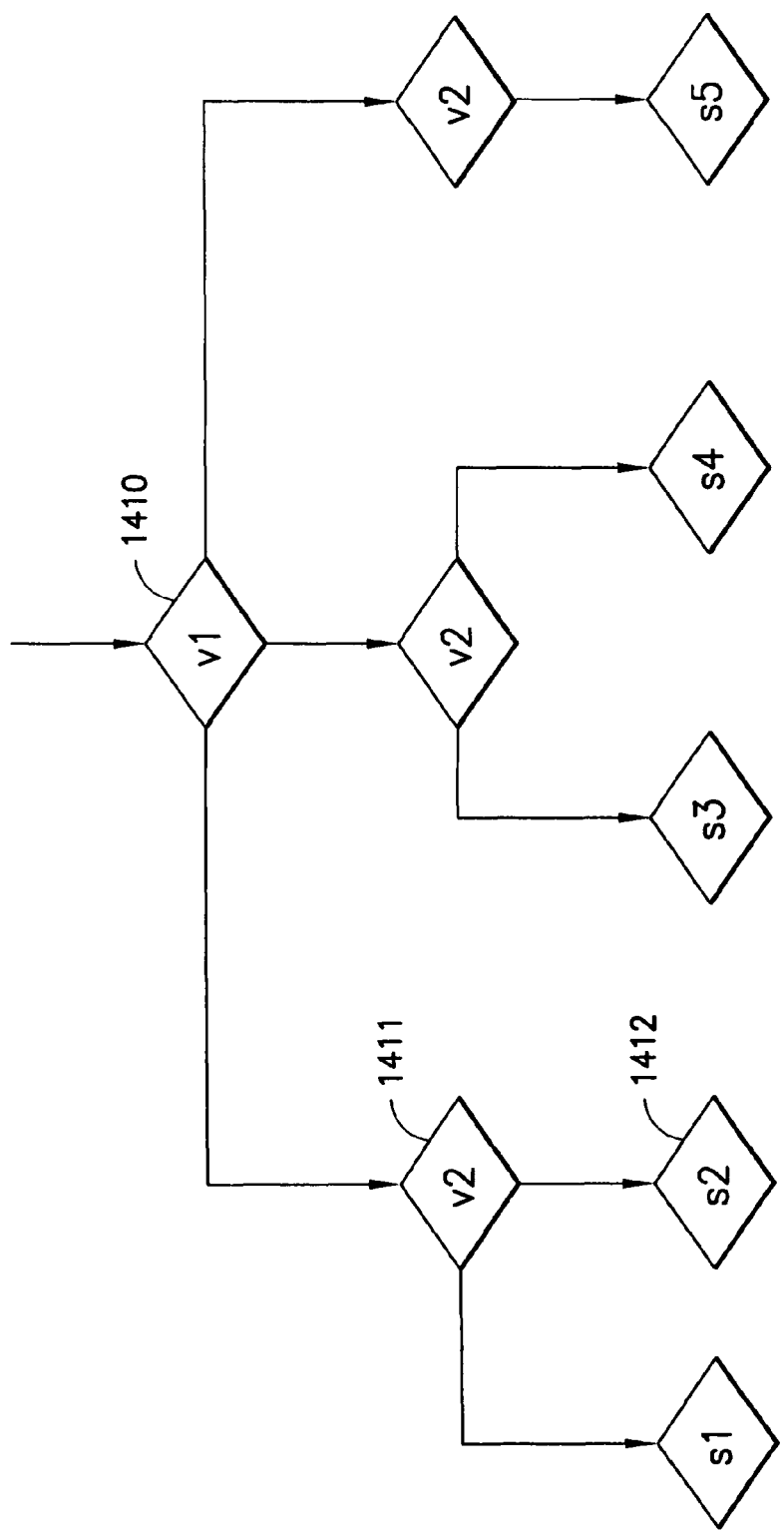
FIG. 14 depicts a decision tree supporting an alternative means by which a service model may be selected in method and systems operating in accordance with the present invention.

FIG. 14 shows a decision tree supporting an alternate means by which the applicable service process may be chosen. The first node in the tree, node 1410, represents a three-way decision based on the current value of the service variable v2. If the path is taken directly downward, the result of this second decision is to select service model s2, which is represented by leaf node 1412. This process takes a number of steps proportional to the logarithm of the number of alternatives, the base of that logarithm being the average fanout of a node. The fan-out of a node is the number of branches from that node to the next lower level in a tree. The average fanout in FIG. 12 is 8/4=2.

Returning to FIG. 12, once block 1213 is complete decision block 1214 tests to see if there was an applicable process. If not, branch 1215 is taken to stop block 1218. If there was an applicable process, branch 1216 is taken to block 1217, which uses the service models data 108 of FIG. 1 to determine the resources needed by this process. Again, if these service models are stored in a relational database such as the IBM Universal DB2 database, then the resources can be determined through an SQL query to this database.

In the description given so far, the focus has been on selecting an appropriate service model capable of delivering service in the current context. In FIG. 1, once block 1114 has selected this model and determined the required resources, block 1115 is responsible for provisioning these resources. Note that the process of provisioning resources may also be dependent on the current context. For example, a particular service model may require a local backup server, so that data in the user's computer can be preserved. If no local backup server is present, one must be provisioned. This provisioning may require the downloading of software to a local server, which, in turn, depends on sufficient bandwidth between that server and the service provider's server. In general, the provisioning of resources for a service may be thought of as a service in its own right. As a service, the service level may be dependent on context and the process by which this service is provided may require selection of an appropriate service model. Fortunately, the processes and means to provide a service whose service level is dependent on context is taught herein.

Finally, block 1119 of FIG. 11 concerns the delivery of the service. An aspect of this invention is to provide to the processes and means by which the service may be delivered with a service level responsive to the context in which the service is delivered. It remains to be described how a service may be delivered in a certain context in accordance with service level agreements previously agreed to.

Note that block 1212 of FIG. 12 has been described as determining current values of the relevant service variables. Since there may be a time delay from this determination to the delivery of the service, that time delay caused by processing delays or delays in provisioning the necessary resources, the values of the service variables may change between the time of original evaluation and the time of service delivery. If these values change significantly, the service model on which the service delivery is based may no longer be appropriate. Thus it will be found advantageous to estimate, or predict the values of the service variables at the time the service is to be delivered, in addition to evaluating them at the current time.

Prediction of the future values of the service variables can be based on various data. In particular, this prediction can be based on historical values of the same service variables. For example, if the bandwidth available between the user's computer and the service provider's server has been constant for a time that is long compared to the time between the current time and the commencement of service delivery, a good assumption would be to estimate the value of this bandwidth to remain constant. Non-constant values may be predicted by time-series analyses of various kinds. Predictions of the future values of the service variables may be based on data concerning the situation. For example, if it can be determined from a user's travel schedule that the user's computer is likely to be in certain place at the time the service is to be delivered and the network connections from that place to the service provider's computer are known to supply a certain bandwidth, it is a good assumption to predict that bandwidth at the time of service delivery.

It may be the case that the prediction of a future value of a service variable is uncertain. In this case, processing can proceed based on the most likely value. Alternatively, if the service is of a critical nature, several service models may be selected in block 1213 of FIG. 12. Partial or complete provisioning of each of these service models may be completed and the actual service model selected just before service delivery, in a manner that has been described in conjunction with FIGS. 13 and 14.

Figure 15:
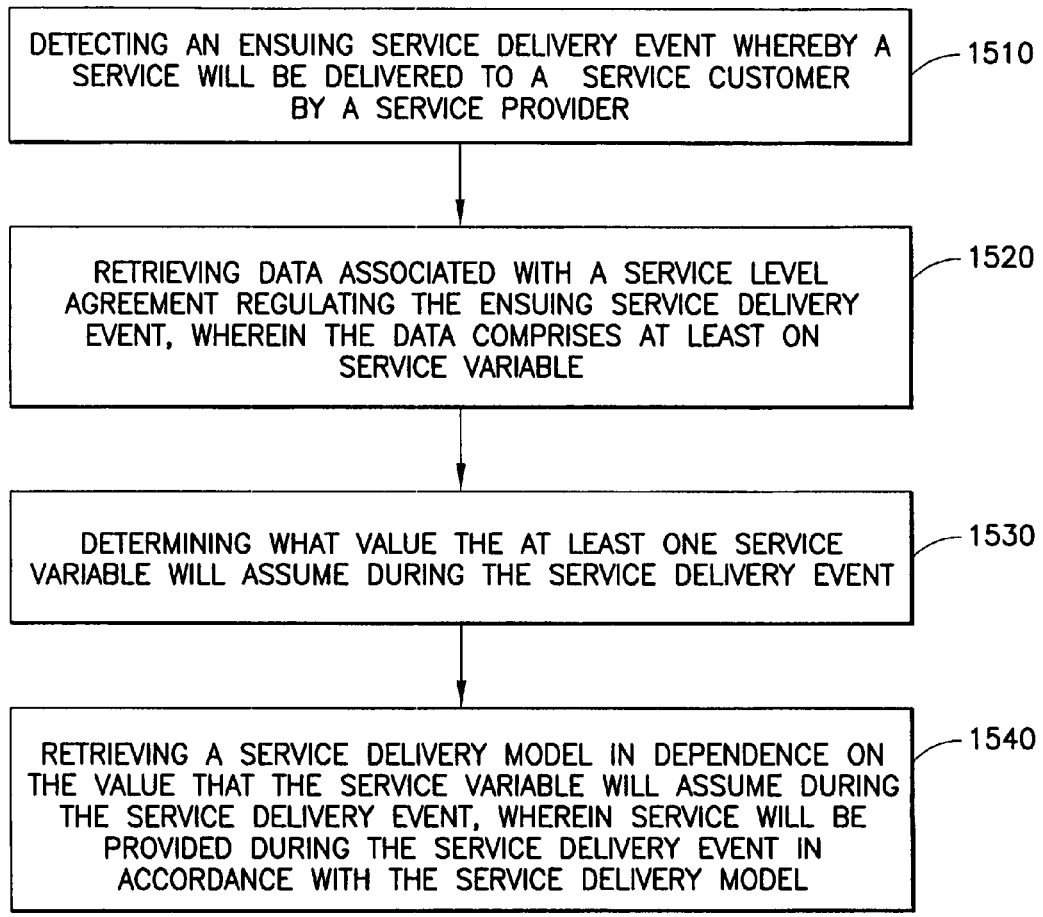
FIG. 15 is a flow chart depicting a method for selecting a service delivery implementation in accordance with the present invention.

A method summarizing the teachings of this aspect of the invention is depicted in the flow chart of FIG. 15, and shows the selection of service delivery implementation for use in managing a service delivery event. At least some parts of the method of FIG. 15 would be performed by the service provider 303 depicted in FIG. 3. In one possible embodiment, the service provider further comprises a memory for storing a computer program capable of performing the operations depicted in FIG. 15; a network interface for bi-directionally communicating with other entities like those depicted in FIG. 3 over a network; and a digital processor for executing the computer program.

At step 1510 of the method, the service provider 303 detects an ensuing service delivery event whereby a particular service will be delivered to a service customer by a service provider. Then, at step 1520, the service provider retrieves data associated with a service level agreement regulating the ensuing service delivery event, wherein the data comprises at least one service variable. In one possible variant, the data would be retrieved through a bi-directional communication with service manager 304. In the embodiment depicted in FIG. 3, service manager 304 regulates access to service level agreements, which are stored in a memory 305 associated with the service manager 304. Next, at step 1530, the service provider determines what value the at least one service variable will assume during the service delivery event. The value that the at least one service variable will assume may in some variants be determined using a context agent. Then, at step 1540, the service provider retrieves a service delivery model from memory 308 in dependence on the value that the service variable will assume during the service delivery event, wherein service will be provided during the service delivery event in accordance with the service delivery model.

In steps additional to those depicted in FIG. 15, resources required during the service delivery event are provisioned using the service delivery model, and once resources are provisioned, the service is provided during the service delivery event in accordance with the service delivery model.

Figure 16:
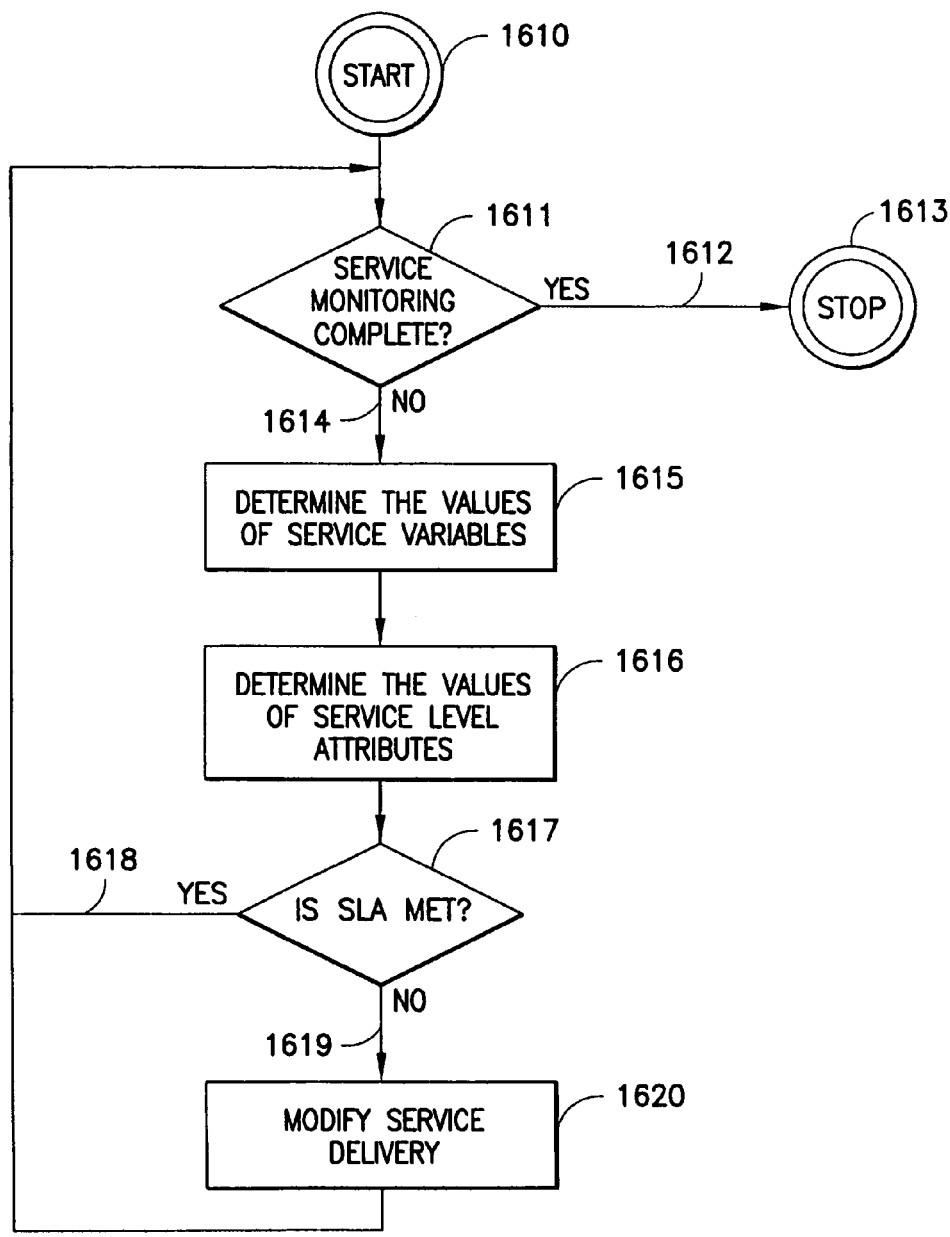
FIG. 16 is a flow chart depicting monitoring of delivery of a service in methods and systems operating in accordance with the present invention.

A further aspect of the present invention concerns whether a service delivery event subject to a service level agreement complies with service level attributes set forth in the service level agreement. FIG. 16 shows an overall flow diagram of the process of monitoring and controlling the delivery of services, where the service level of the service may vary depending on the context in which the service is delivered. Processing begins with start block 1610. Decision block 1611 then determines if the monitoring of this service is complete and, if so, branch 1612 is taken to step block 1613. The determination of the completion of monitoring of a service can be based on many criteria: normally monitoring of a service completes when the delivery of that service completes. However, if the monitoring of a service is found to be excessively expensive, or is affecting the delivery of the service, or if the termination of the monitoring of a service is advantageous for any other reason, then the monitoring of the service should be terminated. The data indicative of the monitoring criteria can be maintained by the service manager server of FIG. 1, or by any other system element.

If the service monitoring is not complete, branch 1614 is taken from decision block 1611 to block 1615, which determines the values of the service variables through means for such. For example, context agent 214 of FIG. 2 may consist of software that can estimate the bandwidth of the communication path between the computer to be served and the service provider's server. Thus the processing in block 1615 may consist of enumerating all of the relevant service variables and activating means by which each and every relevant service is evaluated and reported. Block 1616 is then entered. Block 1616 determines the values of the attributes of the delivery of the service that appear in the applicable service level agreement. For example, one attribute of service delivery is the time between a request for the service by the customer and the time the service commences or completes. The processing of block 1616 is detailed further in FIG. 17.

Figure 17:
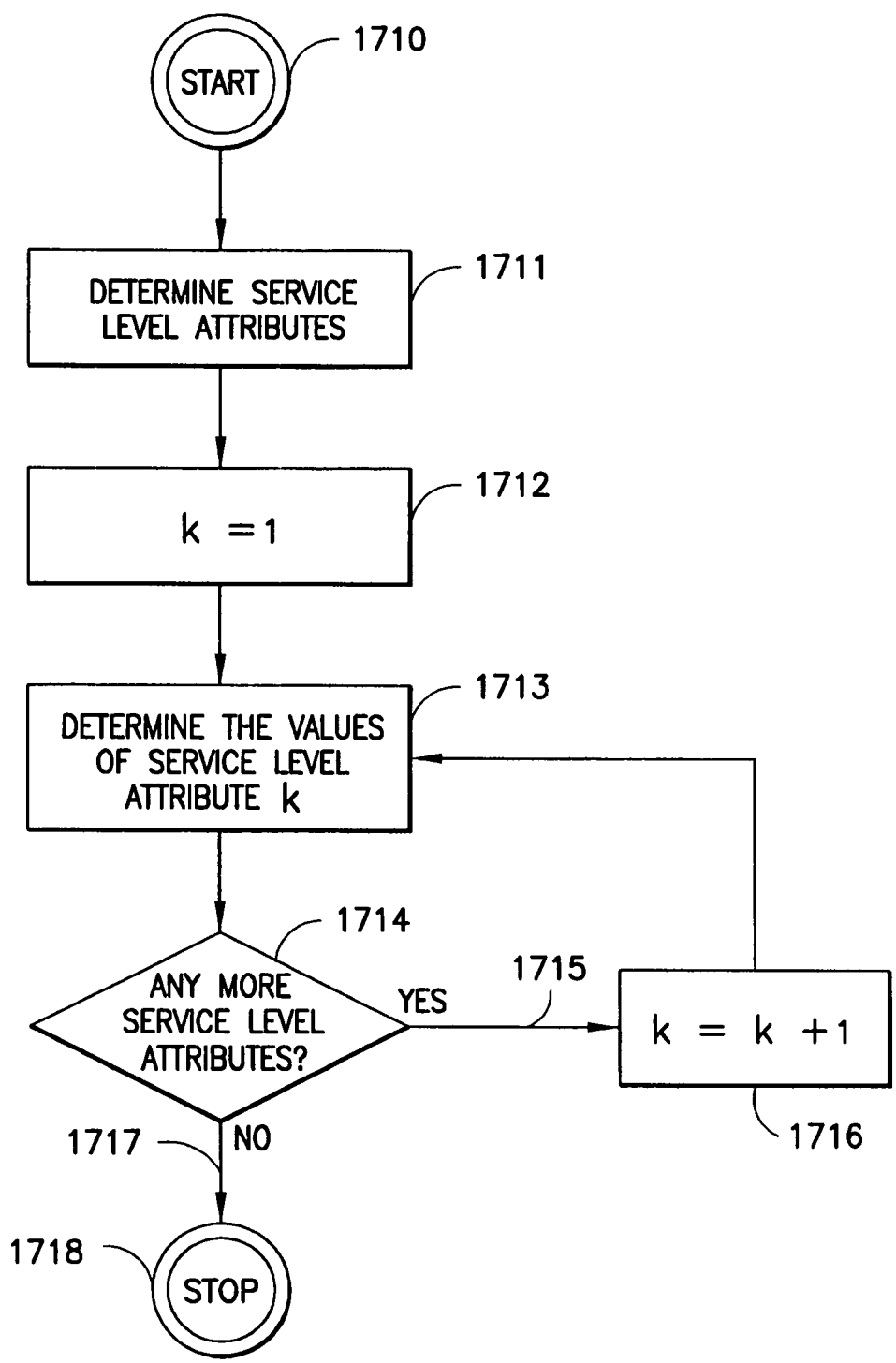
FIG. 17 is a flow chart depicting steps performed to determine service level attributes in systems and methods operating in accordance with the present invention.

FIG. 17 gives a flow diagram of the processing necessary to determine the values of attributes of the delivery of the service. Processing starts with start block 1710. In block 1711 the attributes of the service delivery are determined. These attributes may be found in the service level agreement data 105 maintained by service manager 104 of FIG. 1. If these service level agreements are stored in a relational database such as the IBM Universal DB2 database, then the service level agreement can be determined through an SQL query to this database. Block 1712 initializes a counter of the service level attributes, and block 1713 evaluates that attribute for the current service delivery.

The evaluation of a service level attribute such as service request response time involves data regarding the actual delivery of the service. Such data would normally be maintained by service manager 104 of FIG. 1. This data is captured and maintained in current practice so that reports can be generated by the service provider. Those reports can be used to document adherence to static service level agreements, or to document specific cases wherein adherence is not possible. The subject invention uses this data in a different way. That data is used for real time evaluation of service delivery performance, as shown in FIG. 16.

After the kth service level attribute is evaluated in block 1713, processing continues with decision block 1714, which determines if any more service level attributes need to be evaluated. If so, branch 1715 is taken to block 1716 in which attribute counter k is incremented and block 1713 reentered. If there are no more service level attributes to evaluate, branch 1717 is taken from decision block 1714 to stop block 1718.

Returning now to FIG. 16, when block 1616 completes decision block 1617 is entered. This is a complex decision involving the values of the service variables and the service level attributes. The processing in this decision block is further detailed in FIG. 18.

Figure 18:
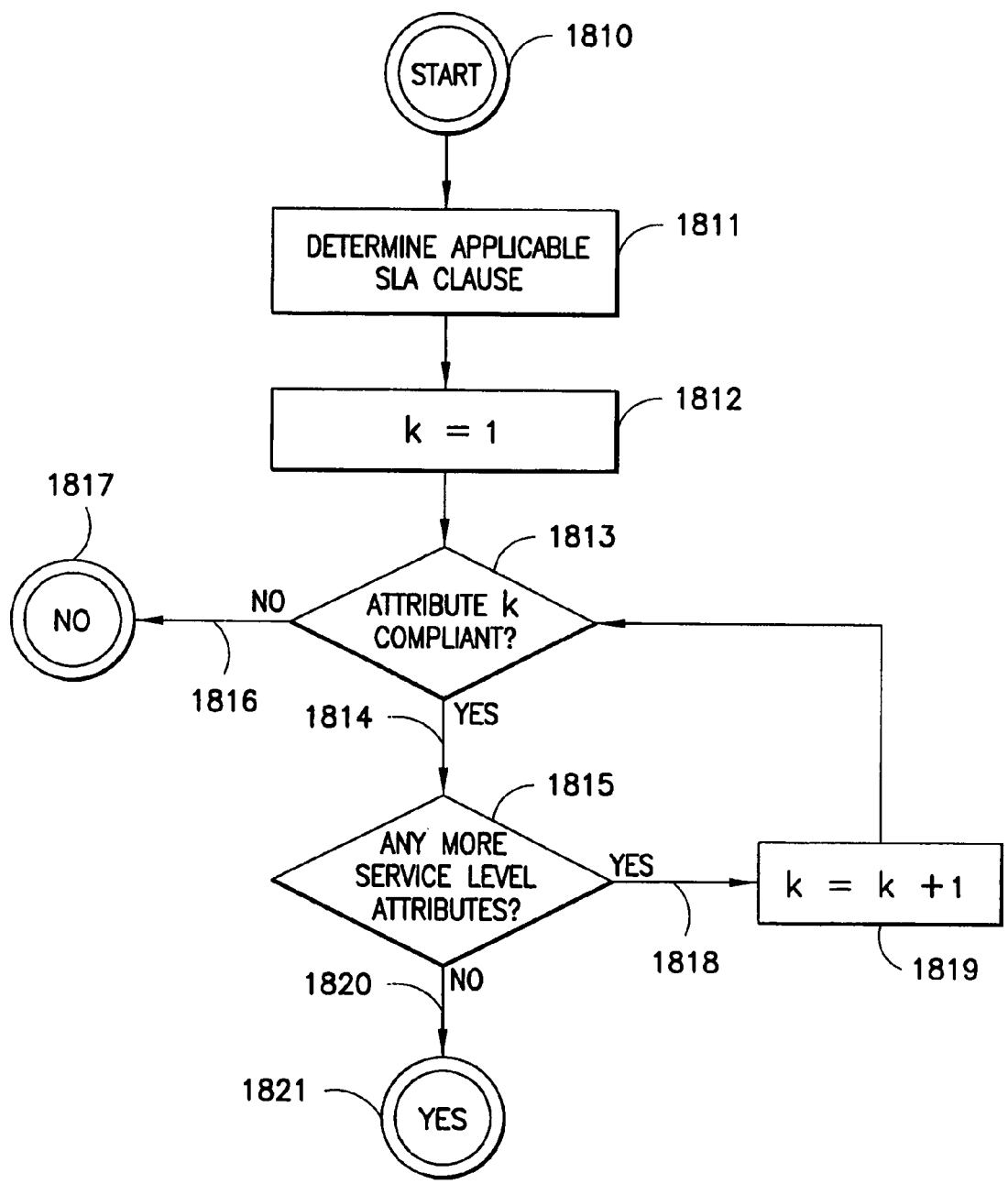
FIG. 18 is a flow chart depicting steps performed to compute SLA compliance in systems and methods operating in accordance with the present invention.

FIG. 18 shows a flow diagram detailing the processing required in block 1617 of FIG. 16. This processing begins in start block 1810 and continues with block 1811. Block 1811 determines the context of the current delivery of the service through comparison of the service variables with the terms of the SLA. For example, if the service is the service of applying patches to the operating system and application programs of the user's computer, and the SLA specifies different service level attributes depending on the bandwidth between the user's computer and the service provider's server. Block 1811 would use the value of the bandwidth service variable to determine which clause of the SLA is applicable. That clause will also specify (one or more) service level attribute(s). If these service level agreements are stored in a relational database such as the IBM Universal DB2 database, then the service level agreement can be determined through an SQL query to this database, and its clauses can be similarly determined.

Block 1812 initializes a counter of service level attributes selected from the selected clause. Block 1813 evaluates the given attribute and compares it to the range of attributes in the service level agreement to determine if it falls within that range. If not, branch 1816 is taken to block 1817, which returns a negative result for decision block 1617 of FIG. 16. If so, branch 1814 is taken to decision block 1815, which determines if there are any more service level attributes to test. If there are none, branch 1820 is taken to block 1821, which returns a positive result for decision block 1617 of FIG. 16. If there are more, branch 1818 is taken to block 1819 which increments the service level attribute counter and continues processing with decision block 1813.

Returning again to FIG. 16, if the SLA is met in the current context, branch 1618 is taken to decision block 1611 to continue the monitoring. This branch may incorporate a delay so as to limit the frequency with which the monitoring process is performed, thereby limiting the overhead of the monitoring process. If the SLA is not met, branch 1619 is taken to block 1620, which modifies the way in which the service is being delivered so as to change its service level attributes and bring them into compliance with the applicable clause of the service level agreement.

The processing performed in block 1620 may be as simple as a change in the parameters to the selected delivery process. For example, if the delivery process has a parameter that controls the priority of that process with respect to other processes in access to shared resources, all that may be required is a change to the process priority. If the process is dependent on resources exclusively allocated to the process, and if that process can use additional such resources to improve the service level attributes, then additional resource provisioning to the process may be required in order to improve its service level attributes. In other cases it may be necessary to terminate the service delivery, restore the state of the managed system to that which was in at the start of service delivery, choose a different service delivery process, provision that process and begin delivering the service with a different process. The process of restoring the state of the managed system to that which it was in at the start of service delivery is called "compensation", and is typically a part of the service model because exactly what must be done is very specific to the chosen service model.

Note that the processing in block 1620 may be initiated in one of two different cases, the first being a failure to meet the terms of an SLA while the service is being delivered in a context that has not changed. The second case is that of a change in context, requiring, potentially, a change from one SLA clause to another, and a different service delivery process.

Note that the processing described in FIG. 16 is purely reactive: that is, no modification of the service delivery happens until the SLA is not met, for whatever reason. The performance of the processing described in FIG. 16 can be improved if the values of the service variables and of the service level attributes are stored, and predictions made of their future values. For example, if it is determined that the bandwidth available to a service is dropping over time, a prediction can be made of the time at which that bandwidth drops below the value of the service variable specified in the service level agreement, and thus the SLA will specify a different set of ranges of service level attributes. This prediction, together with an estimate of how long it will take to shift service delivery to an alternate model, can be used to proactively modify the service delivery in anticipation of a change in context. Similarly, trends in service level attributes can be used to predict when the SLA will no longer be met, and proactive modification of the service delivery initiated.

It may be the case that monitoring and service delivery corrections, as depicted in FIG. 16, are insufficient to ensure SLA compliance. One such case is when the value of a service variable changes so that there is no SLA clause that covers this context. For example, all communications between a site at which service is to be provided and the service provider's server could be cut. Several options are available in such a case. The service provider can institute ad hoc measures, such as physical distribution of media. The service provider can make (reciprocal) agreements with other service providers to cover the case of a serious outage in one or the other's infrastructure. Not shown in FIG. 16 are means for alerting the service provider and the customer of a failure to meet the agreed-to SLA, so as to enable the initiation of alternate procedures. Similarly, trend analysis by an enhanced version of the processing shown in FIG. 16 could alert the service provider and the customer to incipient failures to meet the agreed-to SLA.

The processes described require accurate data. Service variables must be evaluated without error; service level attributes must be measured accurately as well. The subject invention can be extended to handle inaccurate or incomplete data, such as a service level attribute not yet evaluated, or a service variable whose value may be inaccurate due to noise or other errors. In the case of an error or inaccuracy in the value of a service level, the processing of FIG. 17 can be extended with simple or complex means to permit continued monitoring. Suppose block 1713 of FIG. 17 is unable to determine the value of a given service level attribute, but a history of the values of this attribute is available. Then a trend analysis function can be performed to predict the value of this attribute not at a future time, but at the current time. Or it may be that this attribute is correlated in a known way with other attributes, and thus a prediction based on this correlation can be done. If no information about past values of the attribute, or about other attributes with which it may be correlated is available, a default value may be substituted for the attribute in block 1713, subject to the constraint that no more than a certain number of times in a row, or a certain number of times in a total number of evaluations has the default value been used.

Similarly, the context in which a service is delivered has been characterized by a set of service variables, each of equal importance in determining the context. In a more general case, the determination of the current context can be the result of a computation of a weighted sum of the values of service variables, where the weights are not all equal. This permits key service variables, which predominantly determine the context, to be weighted more heavily in the computation of context. A weighted sum of service level attributes may be employed similarly so that more important service level attributes can be given greater weight.

Figure 19:
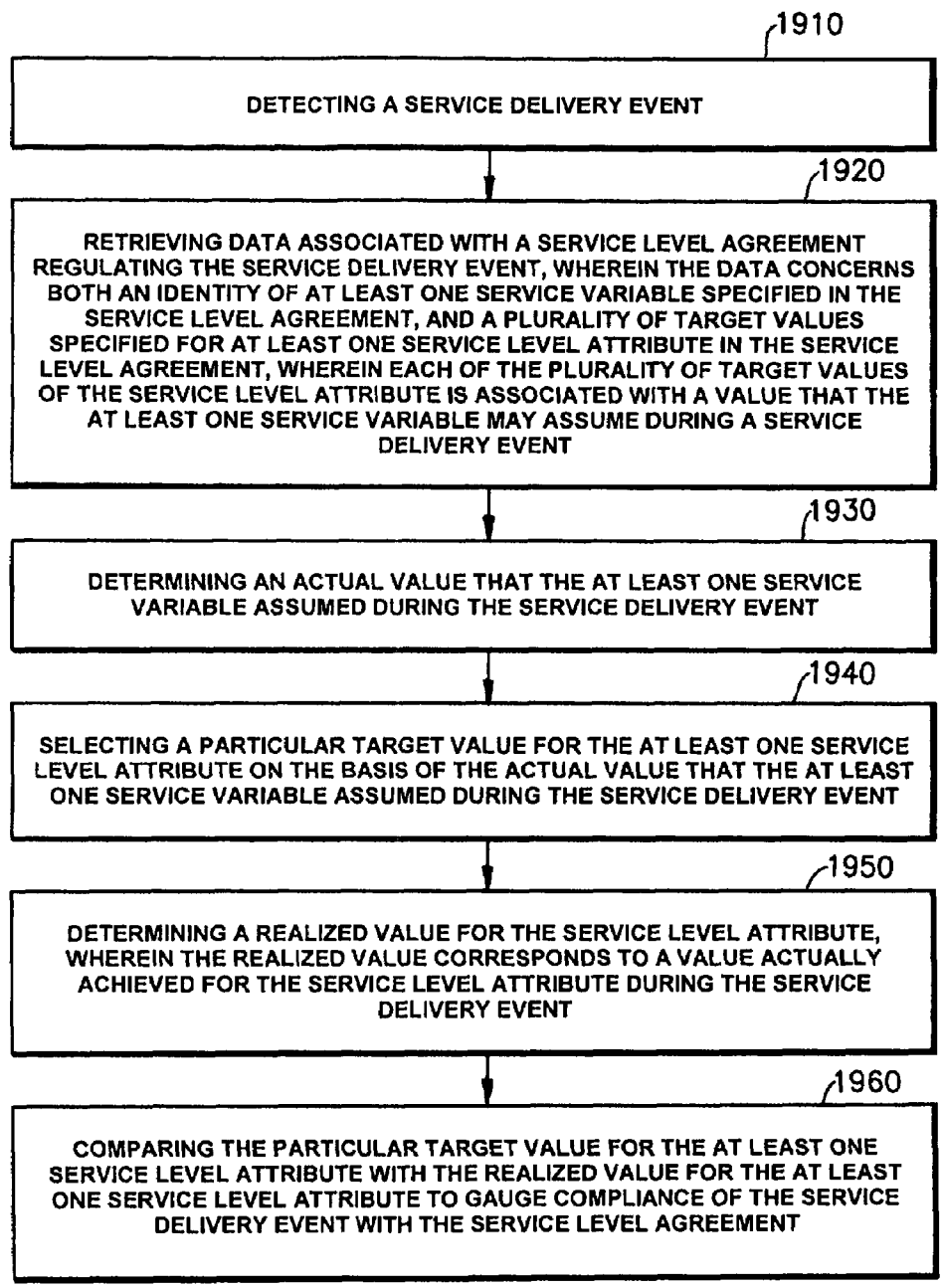
FIG. 19 is a flow chart depicting steps performed to measure compliance with a service level agreement in systems and methods operating in accordance with the present invention

A method summarizing the teachings of this aspect of the invention is depicted in the flow chart of FIG. 19, and shows steps for measuring compliance of a service delivery event with terms of a service level agreement. At least some parts of the method depicted in FIG. 19 may be performed by the service manager 304 depicted in FIG. 3. In one possible embodiment, the service manager 304 further comprises a memory for storing a computer program capable of performing the operations depicted in FIG. 19; a network interface for bi-directionally communicating with other entities like those depicted in FIG. 3 over a network; and a digital processor for executing the computer program.

At step 1910 of the method, the service manager detects a service delivery event. In various embodiments of this aspect of the invention, the service delivery event may be ongoing, or it may already have ended. Then, at step 1920, the service manager 304 retrieves data associated with a service level agreement regulating the service delivery event, wherein the data concerns both an identity of at least one service variable specified in the service level agreement, and a plurality of target values specified for at least one service level attribute in the service level agreement. Each of the plurality of target values of the service level attribute is associated with a value that the at least one service variable may assume during a service delivery event. Then, at step 1930, the service manager determines the actual value that the at least one service variable assumed during the service delivery event. Next, at step 1940, the service manager 304 selects a particular value for the at least one service level attribute on the basis of the actual value that the at least one service variable assumed during the service delivery event. Then, at step 1950, the service manager determines a realized value for the service level attribute, wherein the realized value corresponds to a value actually achieved for the service level attribute during the service delivery event. Next, at step 1960, the service manager compares the particular target value for the at least one service level attribute with the realized value for the at least one service level attribute to gauge compliance of the service delivery event with the service level agreement.

One of ordinary skill in the art will understand that the methods depicted and described herein can be embodied in a tangible machine-readable memory medium. A computer program fixed in a machine readable memory medium and embodying a method or methods of the present invention perform steps of the method or methods when executed by a digital processing apparatus coupled to the machine-readable memory medium. Tangible machine-readable memory media include, but are not limited to, hard drives, CD- or DVD-ROM, flash memory storage devices or in a RAM memory of a computer system.

Thus it is seen that the foregoing description has provided by way of exemplary and non-limiting examples a full and informative description of the best method and apparatus presently contemplated by the inventors for interactive specification of context-sensitive service level agreements; for provisioning of resources required during service delivery events regulated by service level agreements; and for monitoring compliance with service level agreements during service delivery events. One skilled in the art will appreciate that the various embodiments described herein can be practiced individually; in combination with one or more other embodiments described herein; or in combination with other service level agreement systems differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A storage device tangibly embodying a program of machine-readable instructions executable by a digital processing apparatus of a computer system to perform operations comprising:

detecting an ensuing service delivery event wherein a service will be delivered to a service customer by a service provider;

retrieving data associated with at least one service level agreement regulating the ensuing service delivery event, wherein the data comprises at least one service variable for each of a plurality of categories of service variables and at least one service level attribute for each of a plurality of service levels, wherein one of categories of the service variables comprises a role of the customer, and wherein retrieving data further comprises retrieving data indicating that a first one of the service levels is a base level for the selected role of the customer and that a certain combination of values of the service variables will modify the base level to a second level of the service levels based on the role of the customer;

determining what value the at least one service variable will assume for each of the plurality of categories of service variables during the service delivery event;

retrieving a service delivery model in dependence on the value that the at least one service variable will assume for each of the plurality of categories of service variables during the service delivery event, the service delivery model specifying a functional relationship between the at least one service variable for each of the plurality of categories of service variables and the at least one service level attribute for each of the plurality of service levels;

using the functional relationship and the value that the at least one service variable will assume for each of the plurality of categories of service variables during the service delivery event, selecting one of the plurality of service levels and at least one service level attribute that corresponds to the selected service level, wherein using the functional relationship also uses combinations of the values that the at least one service variable will assume for each of the plurality of categories of service variables during the service delivery event, wherein the base level for the selected role of the customer is modified based on the role of the customer from the base level to the second level in response to the values that the at least one service variable will assume for each of the plurality of categories of service variables meeting the certain combination of values of the service variables; and provisioning resources required during the service delivery event in order to meet the selected at least one service level attribute for the selected service level.

2. The storage device of claim 1 wherein the operations further comprise:

using the provisioned resources, providing the service during the service delivery event in order to meet the selected at least one service level attribute for the selected service level.

3. The storage device of claim 1 where determining what value the at least one service variable will assume for each of the plurality of categories of service variables during the service delivery event further comprises:

performing a trend analysis to predict the value the at least one service variable will assume for each of the plurality of categories of service variables during the service delivery event based on past values of the at least one service variable for each of the plurality of categories of service variables prior to the service delivery event.

4. The storage device of claim 1 wherein multiple service delivery models are available for retrieval and wherein values associated with certain service variables result in a conflict about which service delivery model to choose when retrieving a service delivery model in dependence on the value the at least one service variable will assume for each of the plurality of categories of service variables during the service delivery event, wherein the operations further comprise:
   accessing a policy database to resolve the conflict; and
   choosing the service delivery model in accordance with policy established in the policy database.

5. The storage device of claim 1 wherein a plurality of service delivery models are available for retrieval, wherein each service delivery model is applicable to a range of values the at least one service variable may assume for each of the plurality of categories of service variables during a service delivery event, and wherein retrieving a service delivery model in dependence on the value that the service variable will assume for each of the plurality of categories of service variables further comprises:
   choosing a service delivery model specifying a range within which falls the value that the at least one service variable will assume for each of the plurality of categories of service variables during the service delivery event.

6. The storage device of claim 1 wherein multiple service delivery models are available for retrieval, wherein the particular service delivery model chosen for retrieval is chosen using a state-space method, wherein a collection of values that each service variable will assume for each of the plurality of categories of service variables during a service delivery event define a state, and wherein each service delivery model is associated with a space of possible values each service variable may assume for each of the plurality of categories of service variables, the operations further comprising:
   choosing a service delivery model for retrieval that is associated with a space of service variable values which encompasses the state defined by the collection of values that each service variable will assume for each of the plurality of categories of service variables during the service delivery event.

7. A method comprising:
   detecting an ensuing service delivery event wherein a service will be delivered to a service customer by a service provider;
   retrieving data associated with at least one service level agreement regulating the ensuing service delivery event, wherein the data comprises at least one service variable for each of a plurality of categories of service variables and at least one service level attribute for each of a plurality of service levels, wherein one of categories of the service variables comprises a role of the customer, and wherein retrieving data further comprises retrieving data indicating that a first one of the service levels is a base level for the selected role of the customer and that a certain combination of values of the service variables will modify the base level to a second level of the service levels based on the role of the customer;
   determining what value the at least one service variable will assume for each of the plurality of categories of service variables during the service delivery event;
   retrieving a service delivery model in dependence on the value that the at least one service variable will assume for each of the plurality of categories of service variables during the service delivery event, the service delivery model specifying a functional relationship between the at least one service variable for each of the plurality of categories of service variables and the at least one service level attribute for each of the plurality of service levels;
   using the functional relationship and the value that the at least one service variable will assume for each of the plurality of categories of service variables during the service delivery event, selecting one of the plurality of service levels and at least one service level attribute that corresponds to the selected service level, wherein using the functional relationship also uses combinations of the values that the at least one service variable will assume for each of the plurality of categories of service variables during the service delivery event, wherein the base level for the selected role of the customer is modified based on the role of the customer from the base level to the second level in response to the values that the at least one service variable will assume for each of the plurality of categories of service variables meeting the certain combination of values of the service variables; and
   provisioning resources required during the service delivery event in order to meet the selected at least one service level attribute for the selected service level.

8. The method of claim 7 further comprising:
   using the provisioned resources, providing the service during the service delivery event in order to meet the selected at least one service level attribute for the selected service level.

9. The method of claim 7 where determining what value the at least one service variable will assume for each of the plurality of categories of service variables during the service delivery event further comprises:
   performing a trend analysis to predict the value the at least one service variable will assume for each of the plurality of categories of service variables during the service delivery event based on past values of the at least one service variable for each of the plurality of categories of service variables prior to the service delivery event.

10. The method of claim 7 wherein multiple service delivery models are available for retrieval and wherein values associated with certain service variables result in a conflict about which service delivery model to choose when retrieving a service delivery model in dependence on the value the at least one service variable will assume for each of the plurality of categories of service variables during the service delivery event, wherein the method further comprises:
   accessing a policy database to resolve the conflict; and
   choosing the service delivery model in accordance with policy established in the policy database.

11. The method of claim 7 wherein a plurality of service delivery models are available for retrieval, wherein each service delivery model is applicable to a range of values the at least one service variable may assume for each of the plurality of categories of service variables during a service delivery event, and wherein retrieving a service delivery model in dependence on the value that the service variable will assume for each of the plurality of categories of service variables further comprises:
   choosing a service delivery model specifying a range within which falls the value that the at least one service variable will assume for each of the plurality of categories of service variables during the service delivery event.

12. The method of claim 7 wherein multiple service delivery models are available for retrieval, wherein the particular service delivery model chosen for retrieval is chosen using a state-space method, wherein a collection of values that each service variable will assume for each of the plurality of categories of service variables during a service delivery event define a state, and wherein each service delivery model is associated with a space of possible values each service variable may assume for each of the plurality of categories of service variables, the method further comprising:
choosing a service delivery model for retrieval that is associated with a space of service variable values which encompasses the state defined by the collection of values that each service variable will assume for each of the plurality of categories of service variables during the service delivery event.

13. An apparatus comprising:
at least one memory comprising a computer program; and
at least one processor, the at least one processor configured by execution of the computer program to cause the apparatus to perform operations comprising:
detecting an ensuing service delivery event wherein a service will be delivered to a service customer by a service provider;
retrieving data associated with at least one service level agreement regulating the ensuing service delivery event, wherein the data comprises at least one service variable for each of a plurality of categories of service variables and at least one service level attribute for each of a plurality of service levels, wherein one of categories of the service variables comprises a role of the customer, and wherein retrieving data further comprises retrieving data indicating that a first one of the service levels is a base level for the selected role of the customer and that a certain combination of values of the service variables will modify the base level to a second level of the service levels based on the role of the customer;
determining what value the at least one service variable will assume for each of the plurality of categories of service variables during the service delivery event;
retrieving a service delivery model in dependence on the value that the at least one service variable will assume for each of the plurality of categories of service variables during the service delivery event, the service delivery model specifying a functional relationship between the at least one service variable for each of the plurality of categories of service variables and the at least one service level attribute for each of the plurality of service levels;
using the functional relationship and the value that the at least one service variable will assume for each of the plurality of categories of service variables during the service delivery event, selecting one of the plurality of service levels and at least one service level attribute that corresponds to the selected service level, wherein using the functional relationship also uses combinations of the values that the at least one service variable will assume for each of the plurality of categories of service variables during the service delivery event, wherein the base level for the selected role of the customer is modified based on the role of the customer from the base level to the second level in response to the values that the at least one service variable will assume for each of the plurality of categories of service variables meeting the certain combination of values of the service variables; and
provisioning resources required during the service delivery event in order to meet the selected at least one service level attribute for the selected service level.

14. The apparatus of claim 13 further comprising:
using the provisioned resources, providing the service during the service delivery event in order to meet the selected at least one service level attribute for the selected service level.

15. The apparatus of claim 13 where determining what value the at least one service variable will assume for each of the plurality of categories of service variables during the service delivery event further comprises:
performing a trend analysis to predict the value the at least one service variable will assume for each of the plurality of categories of service variables during the service delivery event based on past values of the at least one service variable for each of the plurality of categories of service variables prior to the service delivery event.

16. The apparatus of claim 13 wherein multiple service delivery models are available for retrieval and wherein values associated with certain service variables result in a conflict about which service delivery model to choose when retrieving a service delivery model in dependence on the value the at least one service variable will assume for each of the plurality of categories of service variables during the service delivery event, wherein the operations further comprise:
accessing a policy database to resolve the conflict; and
choosing the service delivery model in accordance with policy established in the policy database.

17. The apparatus of claim 13 wherein a plurality of service delivery models are available for retrieval, wherein each service delivery model is applicable to a range of values the at least one service variable may assume for each of the plurality of categories of service variables during a service delivery event, and wherein retrieving a service delivery model in dependence on the value that the service variable will assume for each of the plurality of categories of service variables further comprises:
choosing a service delivery model specifying a range within which falls the value that the at least one service variable will assume for each of the plurality of categories of service variables during the service delivery event.

18. The apparatus of claim 13 wherein multiple service delivery models are available for retrieval, wherein the particular service delivery model chosen for retrieval is chosen using a state-space method, wherein a collection of values that each service variable will assume for each of the plurality of categories of service variables during a service delivery event define a state, and wherein each service delivery model is associated with a space of possible values each service variable may assume for each of the plurality of categories of service variables, the operations further comprising:
choosing a service delivery model for retrieval that is associated with a space of service variable values which encompasses the state defined by the collection of values that each service variable will assume for each of the plurality of categories of service variables during the service delivery event.

* * * * *